(12) United States Patent
Schlam

(10) Patent No.: US 12,098,890 B2
(45) Date of Patent: Sep. 24, 2024

(54) EVAPORATIVE COOLING SYSTEM

(71) Applicant: Omius Inc., Monterrey (MX)

(72) Inventor: Gustavo Cadena Schlam, Monterrey (MX)

(73) Assignee: Omius Inc., Monterrey (MX)

( * ) Notice: Subject to any disclaimer, the term of this patent is extended or adjusted under 35 U.S.C. 154(b) by 201 days.

(21) Appl. No.: 17/410,995

(22) Filed: Aug. 24, 2021

(65) Prior Publication Data

US 2021/0381773 A1 Dec. 9, 2021

Related U.S. Application Data

(63) Continuation-in-part of application No. 16/574,048, filed on Sep. 17, 2019, now Pat. No. 10,820,652.

(Continued)

(51) Int. Cl.
*F24F 6/02* (2006.01)
*F24F 3/14* (2006.01)
(Continued)

(52) U.S. Cl.
CPC ............... *F28D 7/02* (2013.01); *F28F 3/048* (2013.01); *F28F 13/14* (2013.01); *F28F 13/187* (2013.01)

(58) Field of Classification Search
CPC .... F28F 2245/02; F28F 13/187; F28F 13/185; F28F 13/182; F28D 13/003;
(Continued)

(56) References Cited

U.S. PATENT DOCUMENTS 2,875,447 A 3/1959 Goldmerstein
4,130,902 A 12/1978 Mackenroth, III et al.
(Continued)

FOREIGN PATENT DOCUMENTS

CA 2135966 A1 5/1996
CN 102351494 A 2/2012
(Continued)

OTHER PUBLICATIONS

Almajali, Engineered carbon foam for temperature control applications, May 2010 (Year: 2010), 221 pages.
(Continued)

*Primary Examiner* — Frantz F Jules
*Assistant Examiner* — Jason N Thompson
(74) *Attorney, Agent, or Firm* — Run8 Patent Group, LLC; Peter Miller; Leah Raddatz

(57) ABSTRACT

One variation of a cooling system includes: a cooling unit including a substrate defining a thermally-conductive material and a coating defining a porous, hydrophilic material. The substrate defines: a base; a heatsink structure extending from the base; and an open network of pores extending between surfaces of the substrate. The coating extends across surfaces of the substrate and lines the open network of pores within the substrate. The heatsink structure is configured to: communicate thermal energy from a first working fluid, flowing over the heatsink structure, into the heatsink structure, to cool the first working fluid; and release thermal energy and moisture, contained in pores of the coating, into a second working fluid flowing over the heatsink structure, to cool the second working fluid and the heatsink structure.

14 Claims, 12 Drawing Sheets

Related U.S. Application Data

Figure 1:
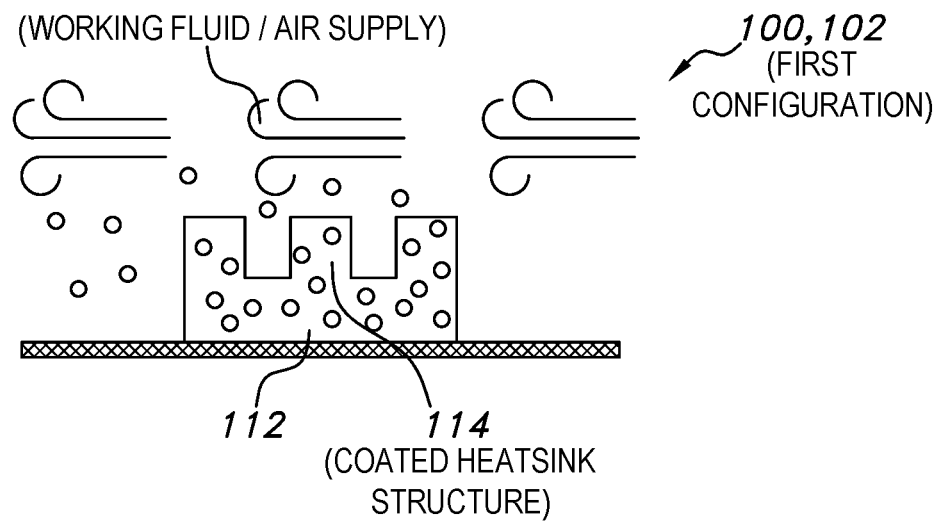

(60) Provisional application No. 63/069,641, filed on Aug. 24, 2020, provisional application No. 62/732,193, filed on Sep. 17, 2018.

(51) Int. Cl.

| | | |
|---|---|---|
| *F24F 6/04* | (2006.01) | |
| *F28D 7/02* | (2006.01) | |
| *F28F 3/04* | (2006.01) | |
| *F28F 13/14* | (2006.01) | |
| *F28F 13/18* | (2006.01) | |

(58) Field of Classification Search
CPC ......... F28D 21/0015; F24F 6/043; F24F 6/04; F24F 6/02; F24F 5/0035; F24F 3/1405; F24F 2006/046
See application file for complete search history.

(56) References Cited

U.S. PATENT DOCUMENTS

| | | | |
|---|---|---|---|
| 4,470,263 A | 9/1984 | Lehovec et al. | |
| 4,833,106 A | 5/1989 | Horie | |
| 5,256,450 A | 10/1993 | Catena | |
| 5,378,529 A | 1/1995 | Bourdeau | |
| 5,624,610 A * | 4/1997 | Yokoya ................ | F24F 3/1417 261/104 |
| 5,800,490 A | 9/1998 | Patz et al. | |
| 5,970,718 A | 10/1999 | Arnold | |
| 6,101,823 A * | 8/2000 | Chiu ...................... | F28D 3/02 165/113 |
| 6,189,327 B1 | 2/2001 | Strauss et al. | |
| 6,367,277 B1 * | 4/2002 | Kinkel ................... | F28D 5/00 62/310 |
| 6,438,964 B1 | 8/2002 | Giblin | |
| 6,948,322 B1 | 9/2005 | Giblin | |
| 7,721,349 B1 | 5/2010 | Strauss | |
| 8,156,570 B1 | 4/2012 | Hockaday | |
| 8,235,096 B1 | 8/2012 | Mahefkey et al. | |
| 8,397,518 B1 | 3/2013 | Vistakula | |
| 9,301,557 B1 | 4/2016 | Santos | |
| 2002/0078704 A1 * | 6/2002 | Stich .................... | B60H 1/3202 62/236 |
| 2002/0195229 A1 | 12/2002 | Hsieh et al. | |
| 2005/0092478 A1 | 5/2005 | Jairazbhoy et al. | |
| 2007/0017814 A1 | 1/2007 | Hwang et al. | |
| 2007/0063360 A1 | 3/2007 | Stenkamp et al. | |
| 2007/0084587 A1 | 4/2007 | Huang et al. | |
| 2008/0066211 A1 | 3/2008 | Laugt et al. | |
| 2009/0049871 A1 | 2/2009 | Klett et al. | |
| 2009/0075581 A1 * | 3/2009 | Van Heeswijk ...... | F24F 1/0007 454/239 |
| 2010/0011489 A1 | 1/2010 | Goldmann et al. | |
| 2010/0116475 A1 * | 5/2010 | Su ........................ | F28F 13/003 165/151 |
| 2011/0017431 A1 | 1/2011 | Yang et al. | |
| 2011/0034887 A1 | 2/2011 | Forden et al. | |
| 2012/0199334 A1 | 8/2012 | Maurer et al. | |
| 2012/0216335 A1 | 8/2012 | Mckenna, Jr. et al. | |
| 2012/0279068 A1 | 11/2012 | Mahefkey et al. | |
| 2013/0030341 A1 | 1/2013 | Freer et al. | |
| 2013/0061503 A1 | 3/2013 | Klett et al. | |
| 2013/0085552 A1 | 4/2013 | Mandel et al. | |
| 2013/0298595 A1 * | 11/2013 | Michel ................. | F28F 13/185 62/476 |
| 2013/0313729 A1 * | 11/2013 | Sakai ..................... | F24F 6/025 261/130 |
| 2014/0109282 A1 | 4/2014 | White et al. | |
| 2014/0367071 A1 * | 12/2014 | Mittelbach ............ | F28F 13/187 165/104.21 |
| 2015/0101788 A1 | 4/2015 | Smith et al. | |
| 2015/0147563 A1 | 5/2015 | Stanis et al. | |
| 2015/0173445 A1 | 6/2015 | Gordon et al. | |
| 2015/0292797 A1 * | 10/2015 | Fan ........................ | F25D 17/02 62/259.4 |
| 2015/0354837 A1 * | 12/2015 | Asthana ................ | F24F 5/0035 62/506 |
| 2015/0369527 A1 * | 12/2015 | Ghadiri Moghaddam ................. F24F 3/1423 62/305 | |
| 2016/0159202 A1 * | 6/2016 | Harms ................... | F25B 39/02 261/29 |
| 2016/0251521 A1 * | 9/2016 | Izutani .................. | C09D 1/00 261/101 |
| 2017/0014266 A1 | 1/2017 | Surace et al. | |
| 2017/0023267 A1 | 1/2017 | Strauss | |
| 2017/0097166 A1 * | 4/2017 | Morris .................... | F24F 6/06 |
| 2018/0035728 A1 | 2/2018 | Salas | |
| 2018/0142924 A1 | 5/2018 | Limon | |
| 2018/0192719 A1 | 7/2018 | Beneyto-Ferre et al. | |

FOREIGN PATENT DOCUMENTS

| | | | |
|---|---|---|---|
| FR | 613033 A | 11/1926 | |
| FR | 2206916 A1 | 6/1974 | |
| FR | 2570935 A1 | 4/1986 | |
| GB | 2405315 A | 3/2005 | |
| JP | H05302173 A | 11/1993 | |
| JP | 2008195016 A | 8/2008 | |
| JP | 2011111643 A | 6/2011 | |
| JP | 2011111644 A | 6/2011 | |
| WO | 9619126 A1 | 6/1996 | |
| WO | 0021473 A1 | 4/2000 | |
| WO | 2011120752 A1 | 10/2011 | |
| WO | 2013004528 A1 | 1/2013 | |
| WO | WO-2016027429 A1 * | 2/2016 | ............ B01D 53/04 |
| WO | 2020034008 A1 | 2/2020 | |

OTHER PUBLICATIONS

Information Disclosure Statement filed in U.S. Appl. No. 16/574,048 dated Mar. 19, 2020, 4 pages.
Machine Translation of JP-2011111644-A, Jun. 2011 (Year: 2011), 19 pages.
Nawaz et al., A Parametric Study on Mass Diffusion Coefficient of Desiccants for Dehumidification Applications: Silica Aerogels and Silica Aerogel Coatings on Metal Foams, Mar. 2015, Science and Technology for the Built Environment, vol. 21, Issue 5 (Year: 2015), 12 pages.
Nawaz et al., Effect of catalyst and substrate on the moisture diffusivity of silica-aerogel-coated metal foams, Jun. 2014, International Journal of Heat and Mass Transfer, vol. 73, pp. 634-644 (Year: 2014), 11 pages.
Nawaz, Aerogel coated metal foams for dehumidification applications, Jan. 2014, IDEALS (Illinois Digital Environment for Access to Learning and Scholarship) (Year: 2014), 210 pages.
Notice of Allowance received in U.S. Appl. No. 16/574,048 dated Jul. 16, 2020, 14 pages.
Office Action received in U.S. Appl. No. 16/574,048 dated Apr. 22, 2020, 8 pages.
Shum et al., Enhancing wicking microflows in metallic foams, Nov. 2017, Microfluidics and Nanofluidics, vol. 21 (Year: 2017), 8 pages.

* cited by examiner

EVAPORATIVE COOLING SYSTEM

CROSS-REFERENCE TO RELATED APPLICATIONS

This Application claims the benefit of U.S. Provisional Application No. 63/069,641, filed on 24, Aug. 2020, which is incorporated in its entirety by this reference.

This Application is a continuation-in-part application of U.S. patent application Ser. No. 16/574,048, filed on 17, Sep. 2019, which claims the benefit of U.S. Provisional Application No. 62/732,193 filed on 17, Sep. 2018, both of which are incorporated in their entireties by this reference.

TECHNICAL FIELD

This invention relates generally to the field of heat transfer and more specifically to a new and useful evaporative cooling system in the field of heat transfer.

BRIE6F DESCRIPTION OF THE FIGURES

Figure 2:
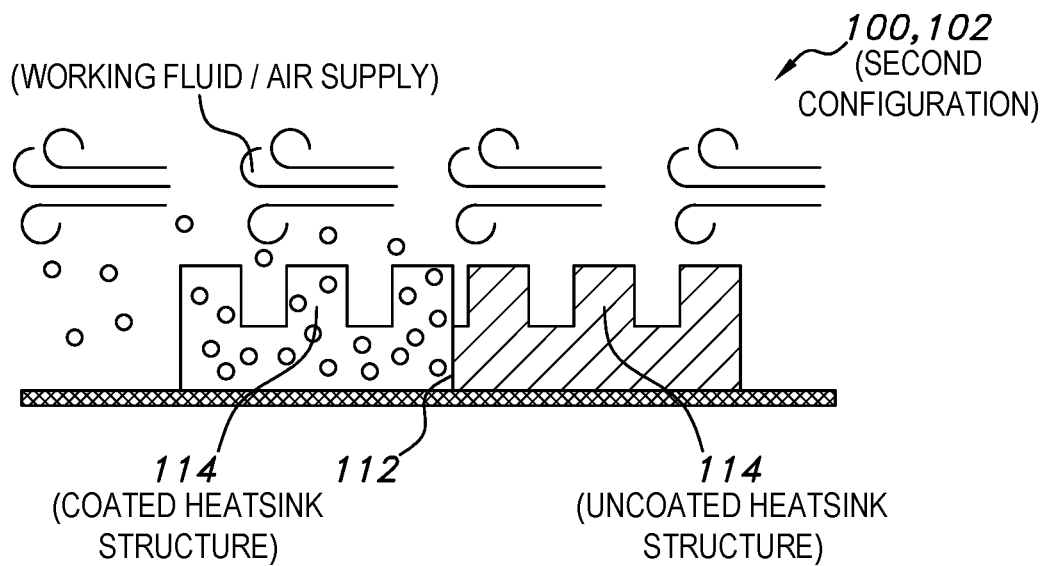
Figure 3:
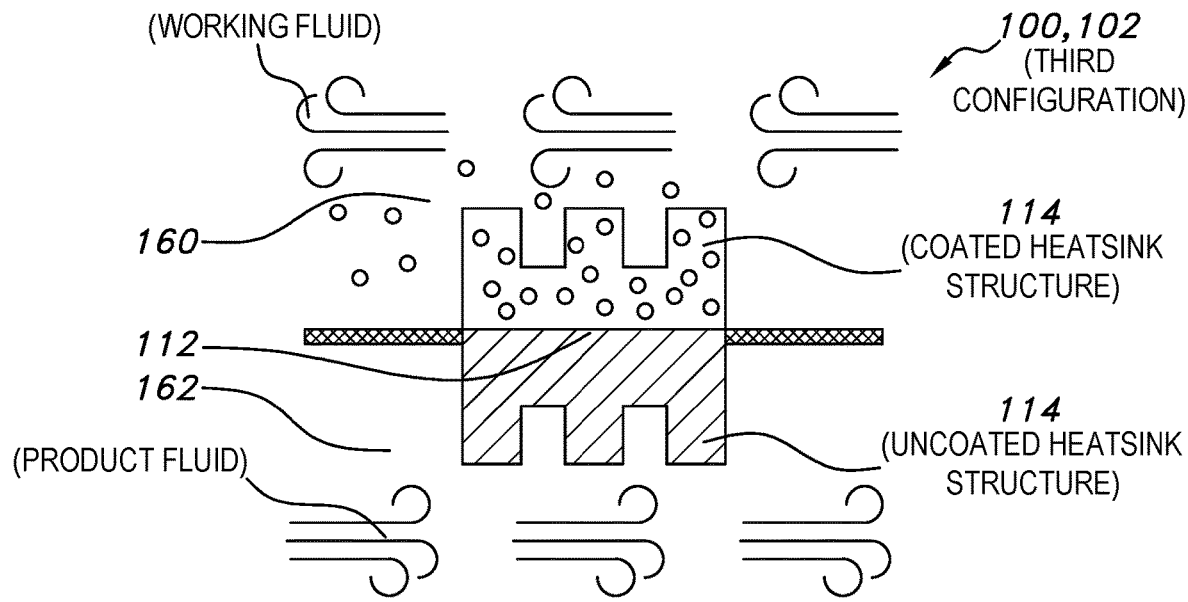
Figure 4:
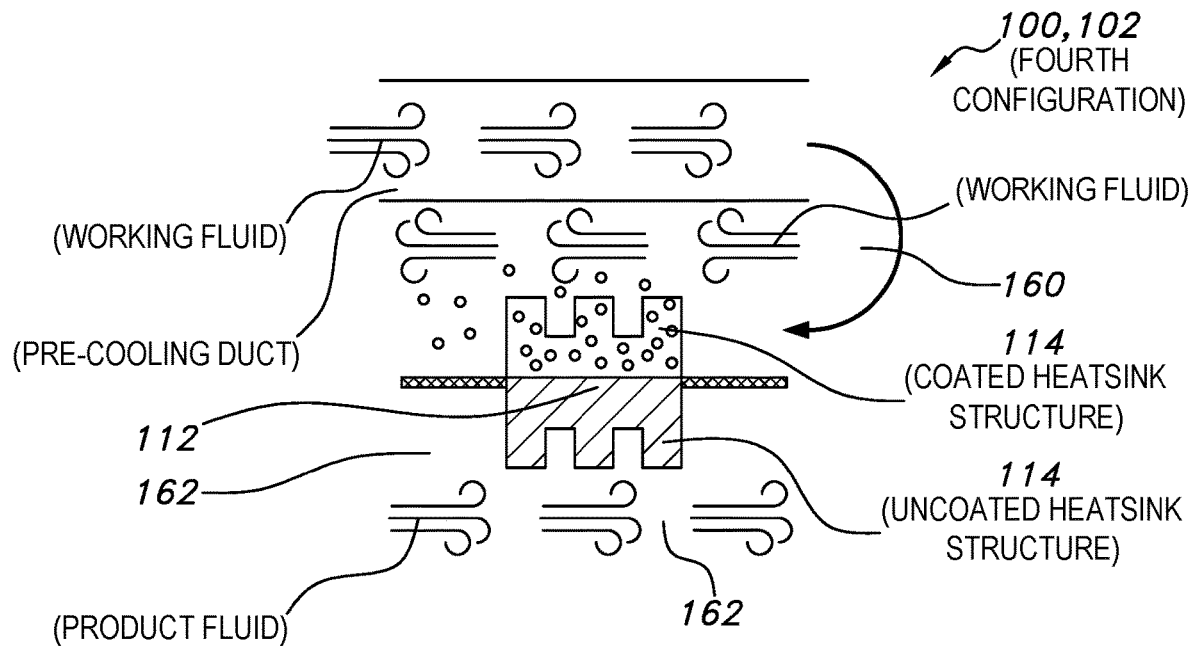
Figure 5:
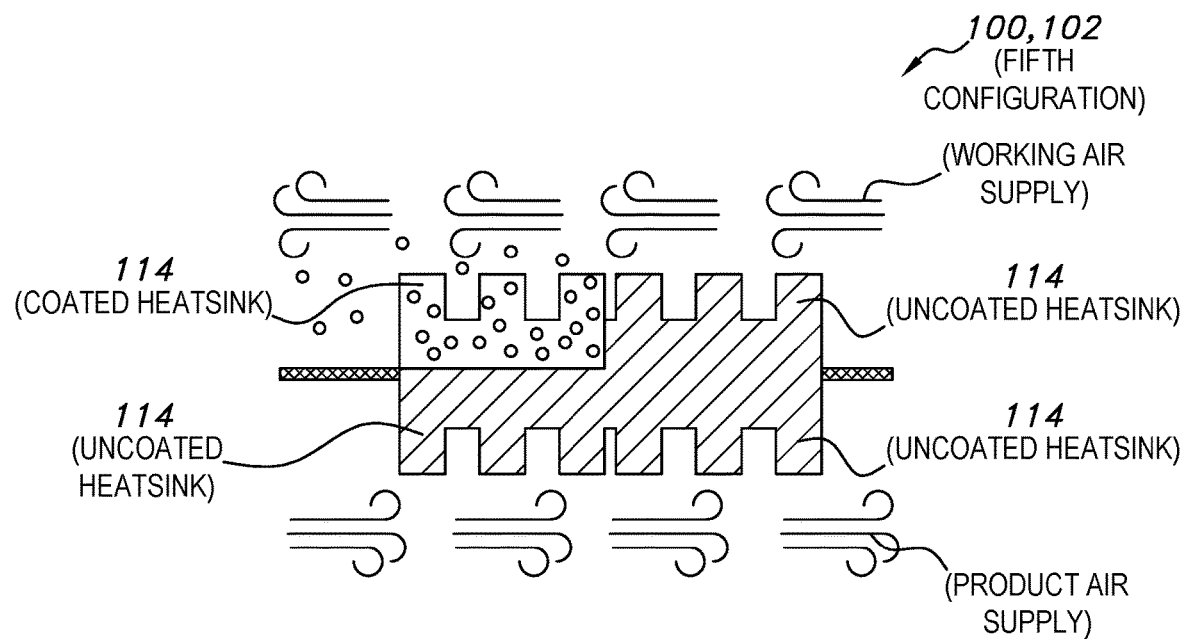
Figure 6:
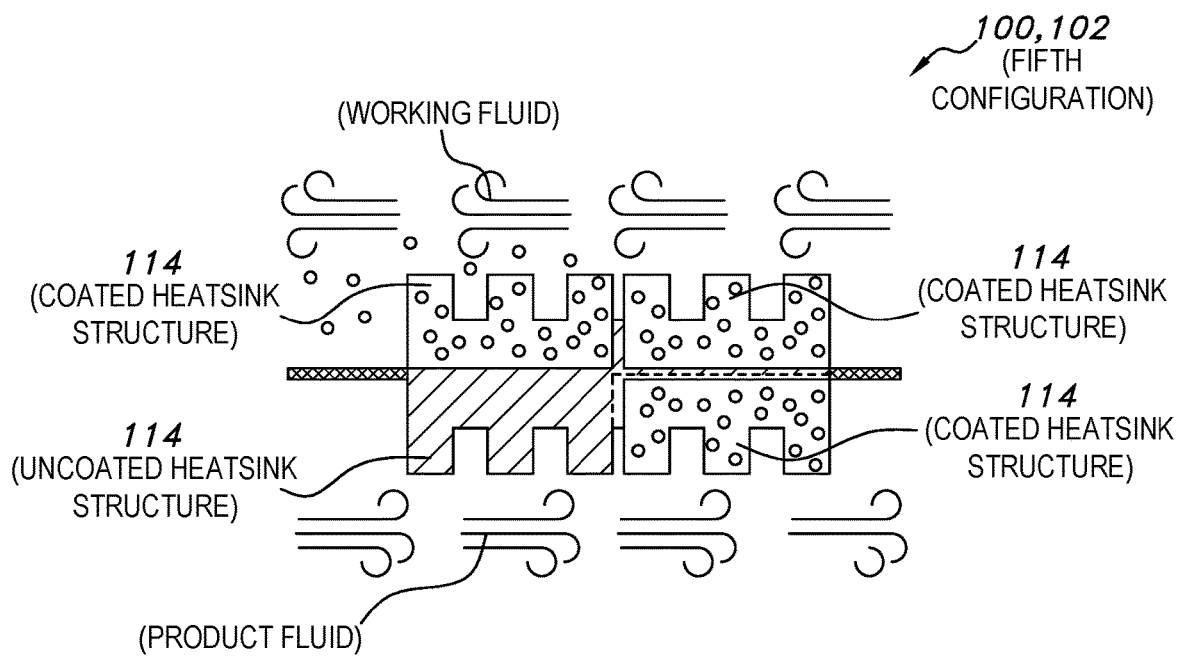
Figure 7A:
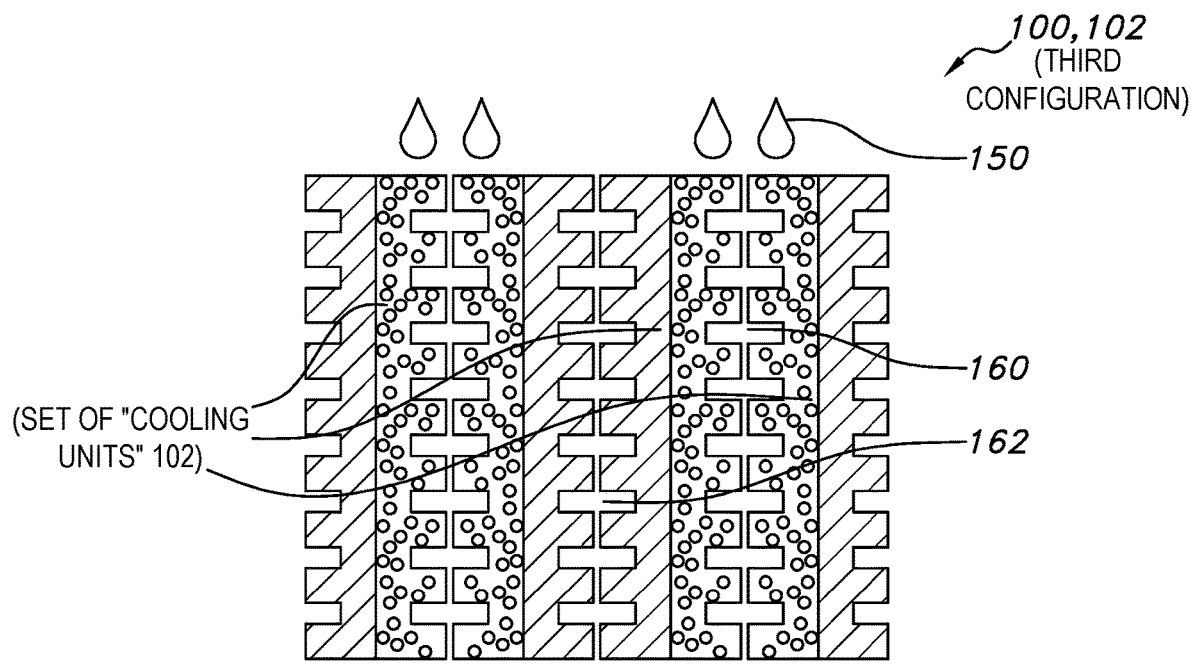
Figure 7B:
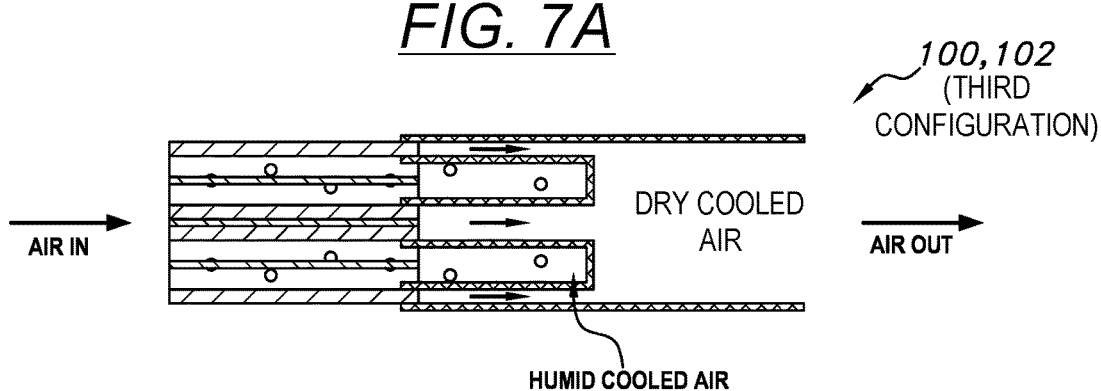
Figure 7C:
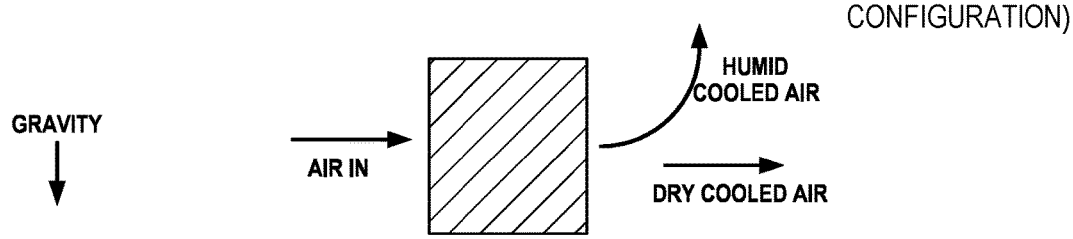
Figure 8A:
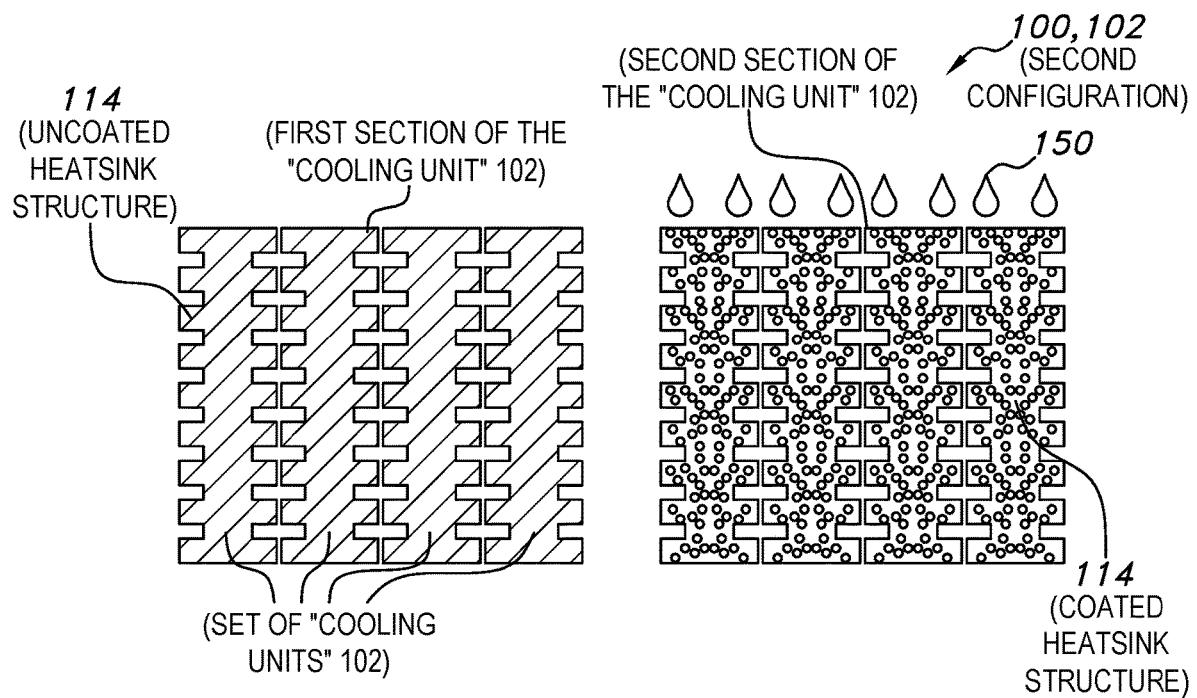
Figure 8B:
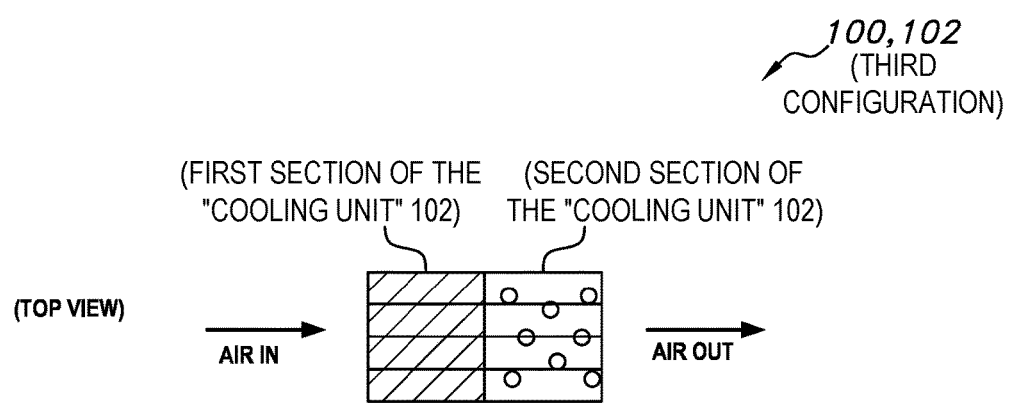
Figure 9A:
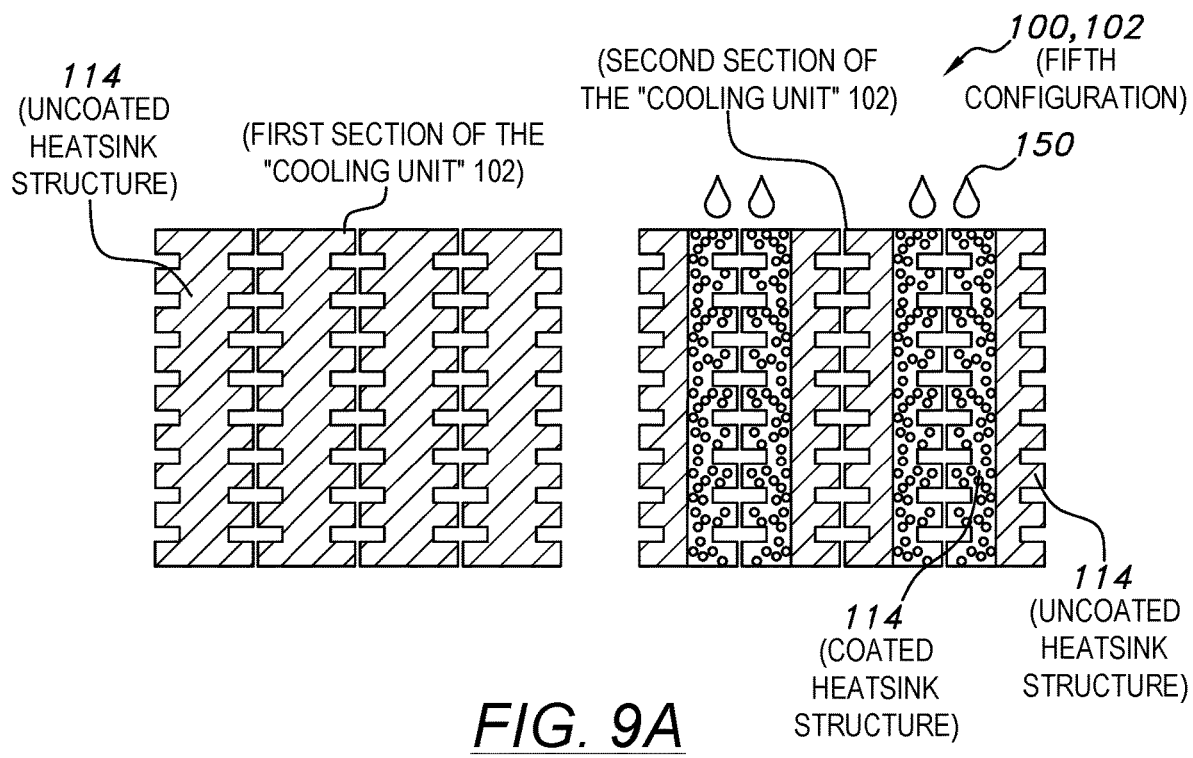
Figure 9B:
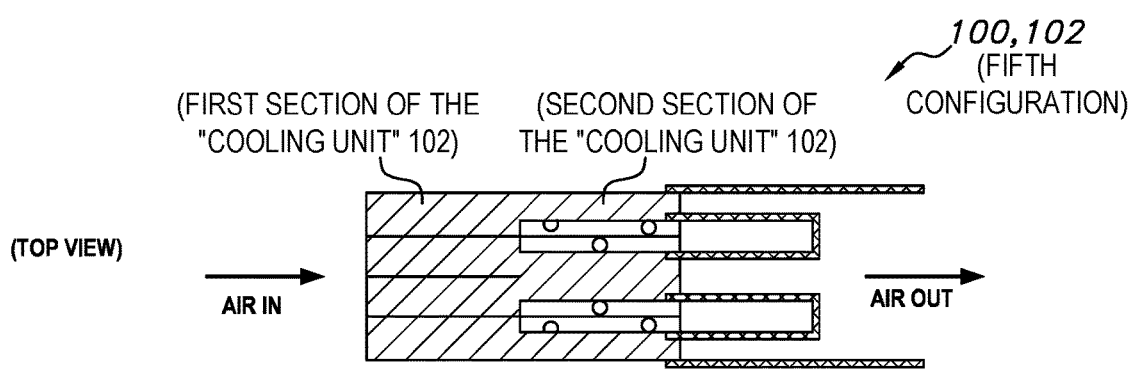
Figure 10A:
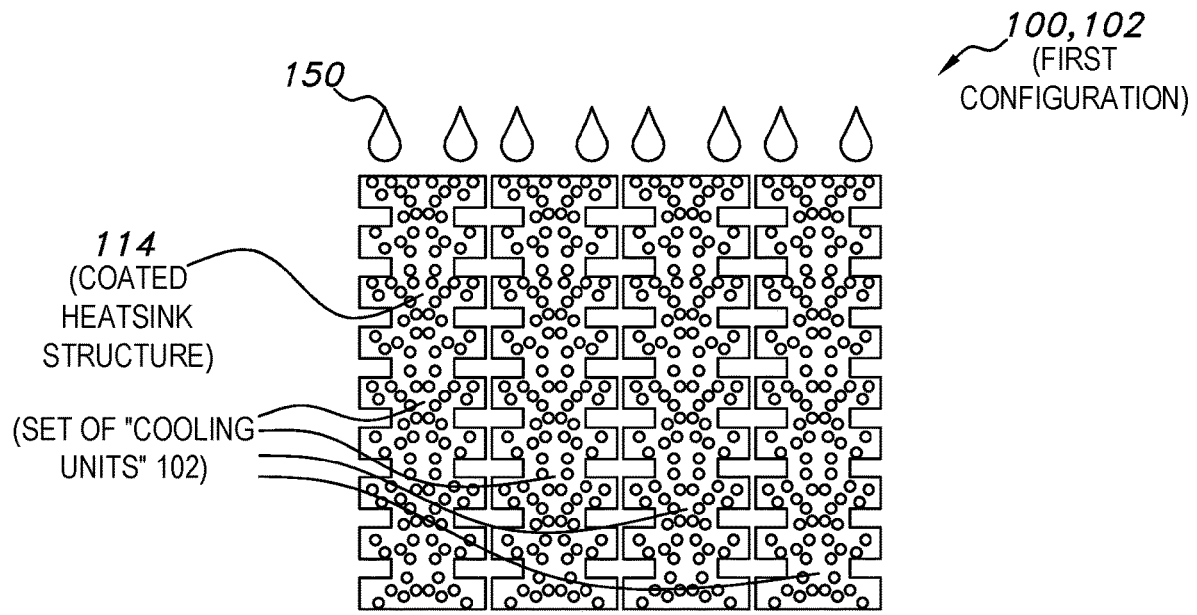
Figure 10B:
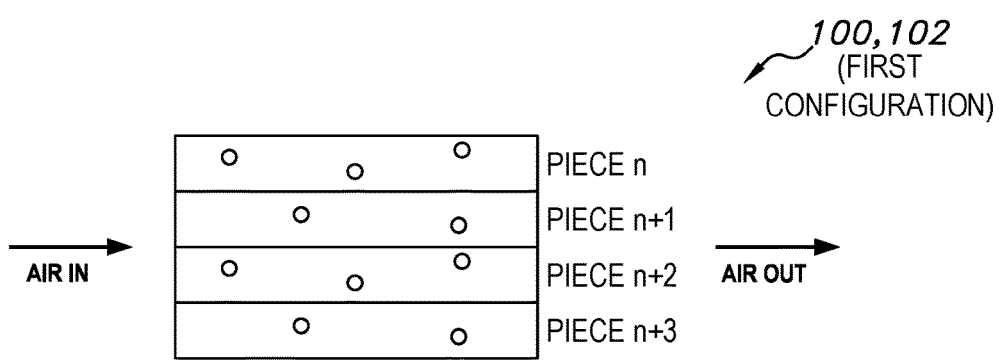
Figure 12:
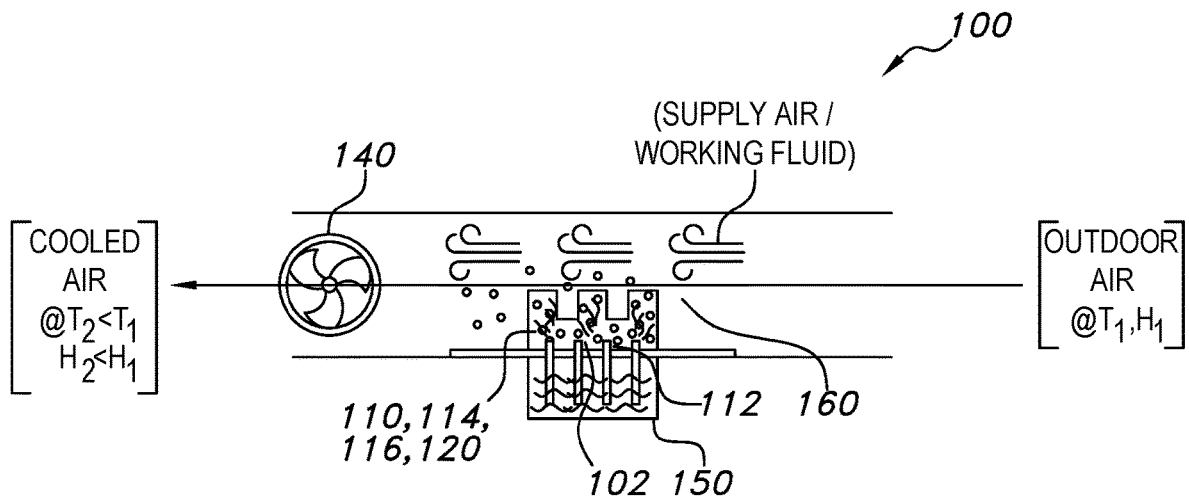
Figure 13:
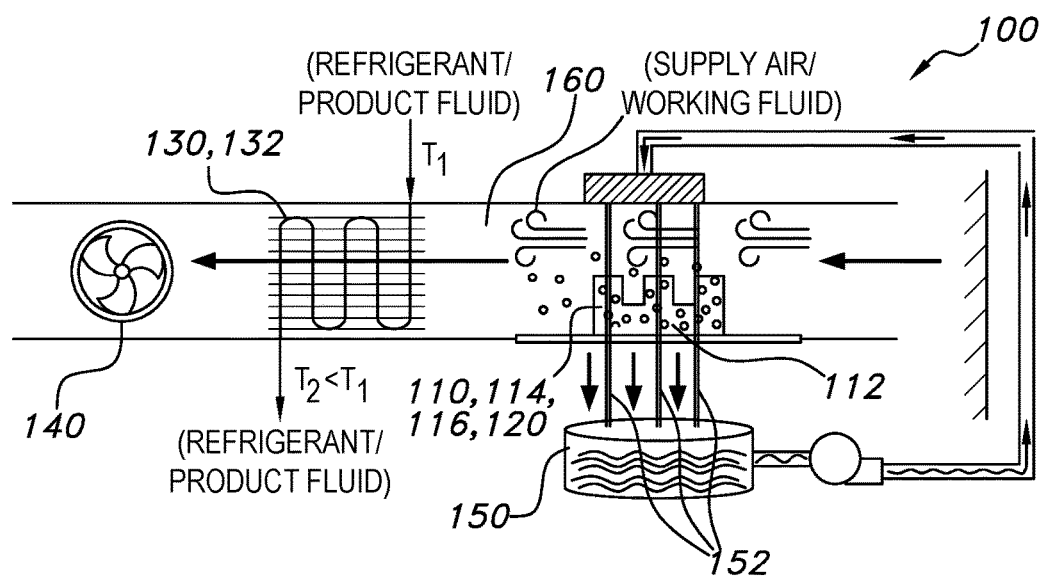
Figure 14:
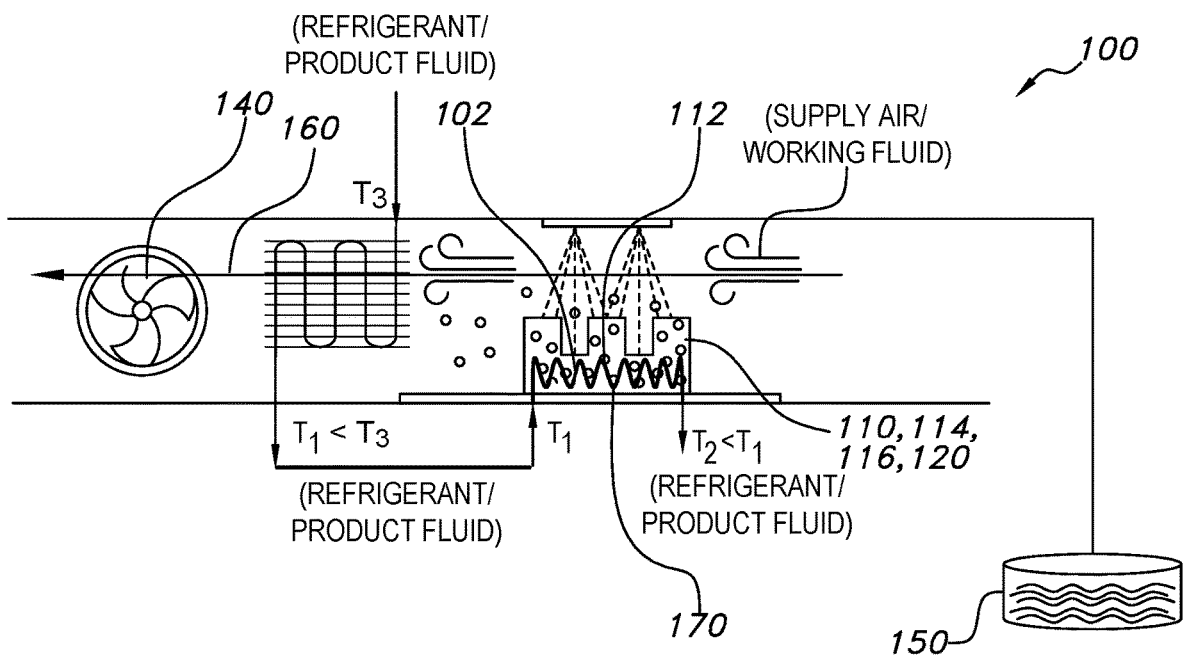
Figure 15:
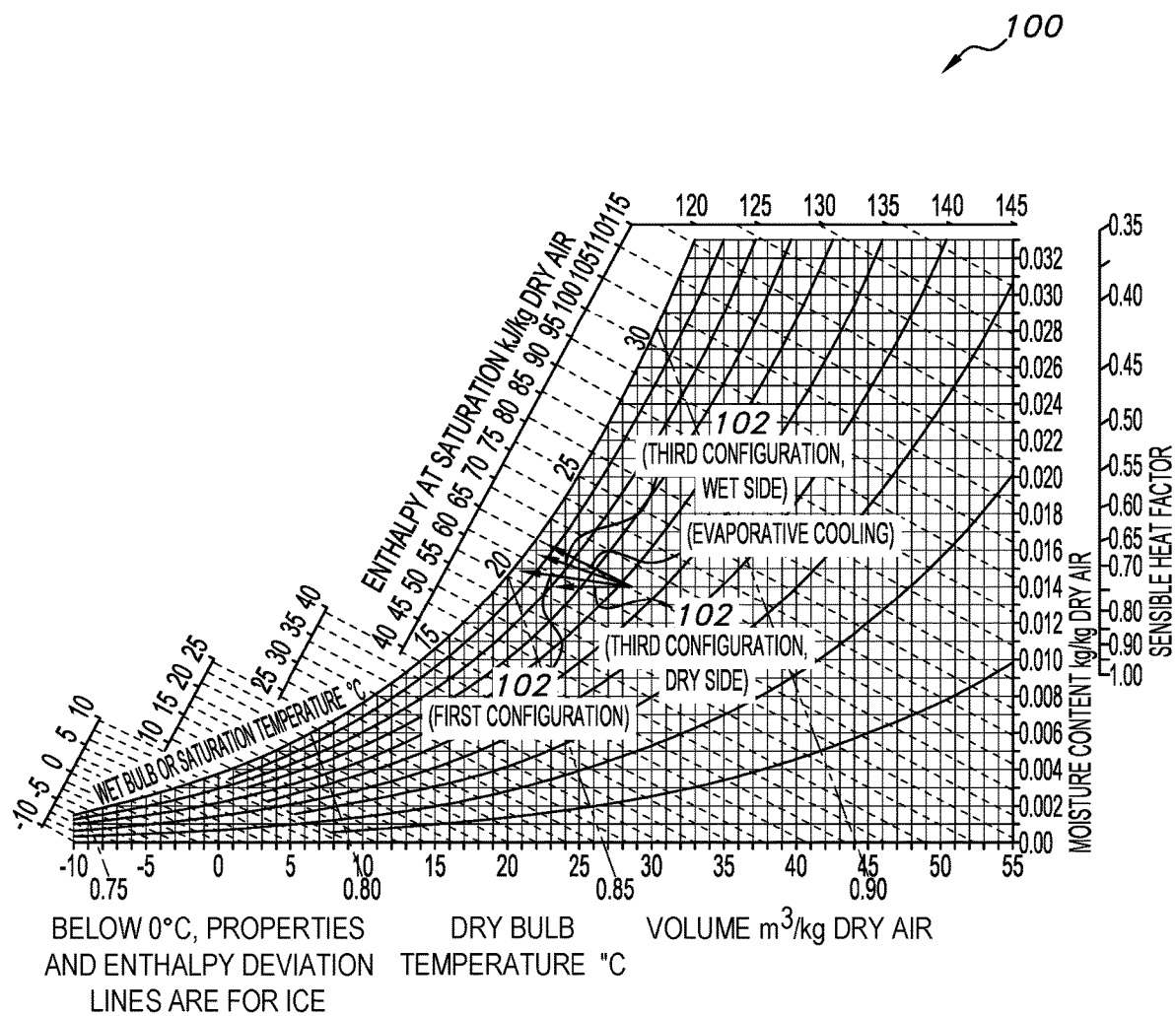

FIG. 1 is a schematic representation of a cooling system;
FIG. 2 is a schematic representation of the cooling system;
FIG. 3 is a schematic representation of the cooling system;
FIG. 4 is a schematic representation of the cooling system;
FIG. 5 is a schematic representation of the cooling system;
FIG. 6 is a schematic representation of the cooling system;
FIGS. 7A-7C are schematic representations of the cooling system;
FIGS. 8A and 8B are schematic representations of the cooling system;
FIGS. 9A and 9B are schematic representations of the cooling system;
FIGS. 10A and 10B are schematic representations of the cooling system;
FIGS. 11A-11D are schematic representations of the cooling system;
FIG. 12 is a schematic representation of the cooling system;
FIG. 13 is a schematic representation of the cooling system;
FIG. 14 is a schematic representation of the cooling system; and
FIG. 15 is a graphical representation of the cooling system.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Cooling Unit

As shown in FIGS. 1, 2, and 12-14, a cooling unit 102 includes: a substrate 110 including a thermally conductive material and defining a base 112 and a heatsink structure 114 extending from the base 112; and a coating 120 including a porous, hydrophilic material and extending across surfaces of the substrate 110. The heatsink structure 114 is configured to: communicate thermal energy from a working fluid, flowing over the heatsink structure 114, into the heatsink structure 114 to cool the working fluid; and release thermal energy via evaporation of moisture, contained in pores of the coating 120, into the working fluid flowing over the heatsink structure 114 to cool the heatsink structure 114 and the working fluid.

1.1 Cooling Unit: Coated+Uncoated Heatsink

In one variation, as shown in FIG. 2, the cooling unit 102 includes: a substrate 110 including a unitary structure defining a base 112, a first heatsink structure 114 (e.g., a coated heatsink structure 114) extending from a first side of the base 112 and along a first portion of the base 112, and a second heatsink structure 114 (e.g., an uncoated heatsink structure 114) extending from the first side of the base 112 and along a second portion of the base 112; and a coating 120 defining a porous, hydrophilic material and extending over surfaces of the first heatsink structure 114 up to a boundary between the first heatsink structure 114 and the second heatsink structure 114. In this variation, the second heatsink structure 114 is configured to communicate thermal energy from a fluid (e.g., air) flowing over the second heatsink structure 114 into the first heatsink structure 114, and the first heatsink structure 114 is configured to release thermal energy and moisture, contained in pores of the coating 120, into the fluid flowing over the first heatsink structure 114.

In one variation, as shown in FIGS. 3 and 4, the cooling unit 102 includes: a substrate 110 including a unitary structure defining a base 112, a first heatsink structure 114 (e.g., a coated heatsink structure 114) extending from a first side of the base 112, and a second heatsink structure 114 (e.g., an uncoated heatsink structure 114) extending from a second side of the base 112; and a coating 120 defining a porous, hydrophilic material and extending over surfaces of the first heatsink structure 114 up to a boundary between the first heatsink structure 114 and the second heatsink structure 114. The first heatsink structure 114 is configured to release thermal energy and moisture, contained in pores of the coating 120, into a working fluid (e.g., working air supply) flowing over the first heatsink structure 114. The second heatsink structure 114 is configured to communicate thermal energy from a product fluid (e.g., product air supply), flowing over the second heatsink structure 114 and separated from the working fluid, into the first heatsink structure 114.

2. Cooling System

As shown in FIGS. 7A, 7B, 9A, 9B, 13A, and 12-14, a cooling system 100 includes: a cooling unit 102; a water supply 150 configured to supply water to the heatsink structure 114; a working fluid duct 160 (e.g., an air duct) configured to communicate air across the heatsink structure 114 in each cooling unit 102 in the set of cooling units 102; and a fan 140 configured to draw air in a first direction through the working fluid duct 160 and across the heatsink structure 114.

Figure 11A:
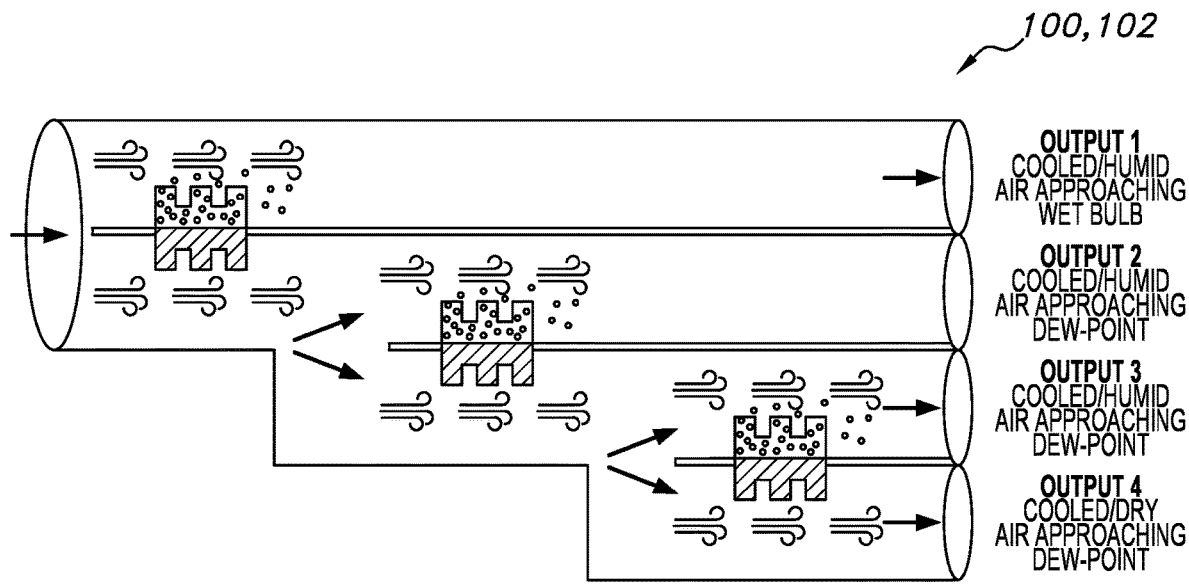
Figure 11B:
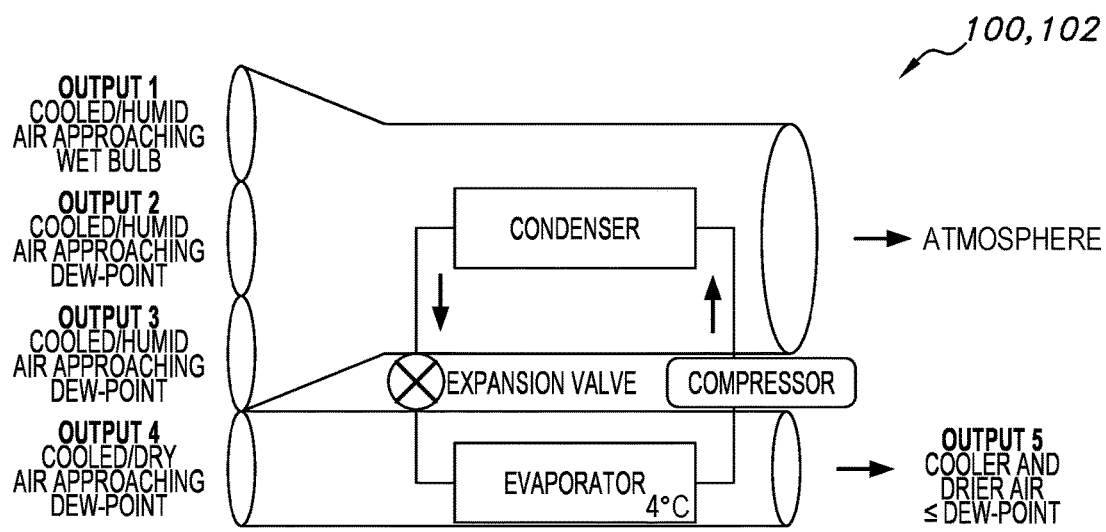
Figure 11C:
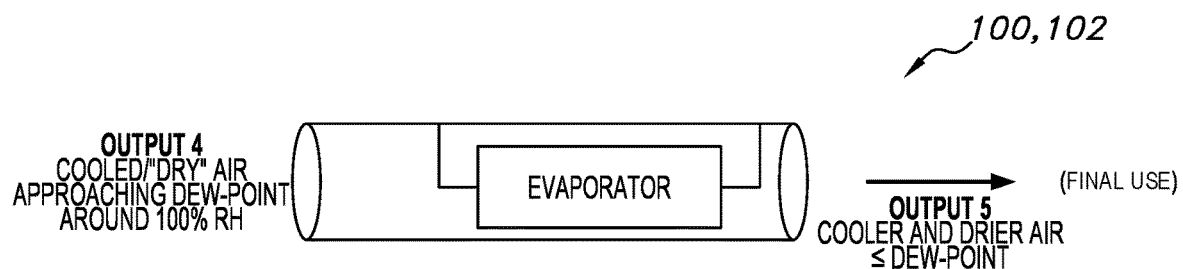
Figure 11D:
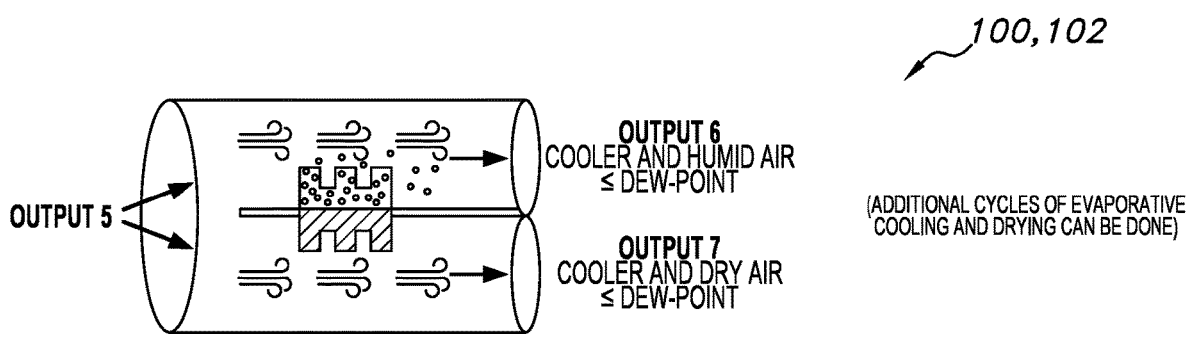

In one variation, as shown in FIG. 11A, the cooling system 100 includes: a set of cooling units 102; a water supply 150 configured to supply water to the heatsink structure 114 in each cooling unit 102 in the set of cooling units 102; a working fluid duct 160 configured to communicate air across the heatsink structure 114 in each cooling unit 102 in the set of cooling units 102; and a fan 140 configured to draw air through the working fluid duct 160 and across the heatsink structure 114 in each cooling unit 102 in the set of cooling units 102.

2.1 Cooling System: Coated+Uncoated Heatsink

In one variation, as shown in FIGS. 7A-7C, 8A-8B, and 9A-9B, a cooling system 100 includes: a set of cooling units 102; a water supply 150 configured to supply water to the first heatsink structure 114 (e.g., the coated heatsink structure 114) in each cooling unit 102 in the set of cooling units 102; a working fluid duct 160 configured to communicate air across the first heatsink structure 114 in each cooling unit 102 in the set of cooling units 102; and a product fluid duct 162 configured to communicate air across the second heatsink structure 114 (e.g., the uncoated heatsink structure 114) in each cooling unit 102 in the set of cooling units 102.

2.2 Cooling System: HVAC—Cooling Unit+Condenser

In one variation, as shown in FIG. 13, a cooling system 100 includes a cooling unit 102; a condenser 130; and a fan 140.

The cooling unit 102 includes: a coating 120 defining a porous, hydrophilic material; and a substrate 110 defining a thermally conductive material. The substrate 110 defines: a base 112; and a heatsink structure 114 extending from the base 112 and coated with the coating 120. The heatsink structure 114 is configured to: communicate thermal energy from a working fluid (e.g., working air supply), flowing over the heatsink structure 114, into the heatsink structure 114 to cool the working fluid; and release thermal energy via evaporation of moisture, contained in pores of the coating 120, into the working fluid flowing over the heatsink structure 114 to cool the heatsink structure 114 and the working fluid.

The condenser 130 includes a set of coils 132 and is configured to: receive the working fluid from the cooling unit 102 fluidly coupled to the condenser 130; and communicate thermal energy from a product fluid (e.g., refrigerant), flowing through the set of coils 132, into the working fluid, flowing over the set of coils 132.

The fan 140 is configured to draw air in a first direction across the heatsink structure 114 of the substrate 110 and the set of coils 132 of the condenser 130.

2.3 Cooling System: HVAC—Evaporative Condenser

In one variation, as shown in FIG. 14, a cooling system 100 includes a cooling unit 102 including: a substrate 110; a coating 120; and a set of fluid channels 170.

The substrate 110 includes a thermally conductive material and defines: a base 112; and a heatsink structure 114 extending from the base 112. The coating 120 includes a porous, hydrophilic material and extends across surfaces of the substrate 110. The set of fluid channels 170 extends through the substrate 110 and is configured to transport a product fluid (e.g., refrigerant) through the substrate 110.

In this variation, the heatsink structure 114 is configured to: communicate thermal energy from air, flowing over the heatsink structure 114, into the heatsink structure 114; release thermal energy via evaporation of moisture, contained in pores of the coating 120, into air (i.e., the working fluid) flowing over the heatsink structure 114; and communicate thermal energy from the product fluid, flowing through the set of fluid channels 170, into the heatsink structure 114 to cool the product fluid.

In this variation, the cooling system 100 further includes a fan 140 configured to draw air across the heatsink structure 114 of the substrate 110.

3. Applications

Generally, the cooling system 100 includes a set of cooling units 102 that remove heat from a product air source via evaporative cooling. Each cooling unit 102 includes: a thermally-conductive, unitary substrate no (e.g., of graphite foam) defining a base 112 and heatsink structure 114 (e.g., a set of fins) extending from the base 112; and a porous, hydrophilic coating (e.g., a cementitious coating) applied to surfaces of the substrate no, thereby increasing hydrophilicity of these surfaces. The cooling unit 102—forming a unitary contiguous structure—may therefore exhibit: high thermal conductivity—and therefore high sensible cooling efficiency—due to the substrate material; and increased wicking and/or distribution of moisture throughout coated surfaces of the substrate 110—and therefore high evaporative cooling efficiency—due to the porous and hydrophilic coating 120.

In particular, the substrate 110—defining an open network of pores 116 extending between surfaces of the substrate 110—and the coating 120—defining a void network including micropores that wick water through the coating 120—can cooperate to: wick and distribute moisture across surfaces of the substrate no (e.g., exterior surfaces and/or surfaces within the open network of pores), coated in the coating 120, thereby enabling increased evaporative cooling; and provide an increased heat exchange surface (e.g., within the open network of pores) and enable airflow through the cooling unit 102, thereby enabling increased sensible cooling.

Thus, by leveraging both evaporative cooling (i.e., indirect cooling) and sensible cooling (i.e., direct cooling), the cooling unit 102 can cool an inbound fluid (e.g., air), flowing through the cooling unit 102, to a temperature below the wet-bulb temperature of inbound fluid, such as approaching a dew-point temperature of the inbound fluid, as shown in FIG. 15.

In one implementation, the cooling unit 102 includes: a first heatsink structure 114 (or "coated heatsink structure 114") extending from the base 112 of the substrate 110, and a second heatsink structure 114 (or "uncoated heatsink structure 114") extending from the base 112 of the substrate 110 (e.g., adjacent or opposite the coated heatsink structure 114); and a porous, hydrophilic coating (e.g., a cementitious coating) applied to surfaces of the coated heatsink structure 114, thereby increasing hydrophilicity of these surfaces. In this implementation, the cooling unit 102—forming a unitary contiguous structure—may therefore exhibit: high thermal conductivity between the coated (or "wet side") heatsink structure 114 and the uncoated (or "dry side") heatsink structure 114; high rates of moisture wicking across the coated heatsink structure 114—and therefore high evaporative cooling efficiency—due to the porous, hydrophilic coating 120; and high hydrophobicity across the uncoated heatsink structure 114—therefore maintaining dry, cool product air moving across the uncoated heatsink structure 114—due to absence of the coating 120 on the uncoated heatsink structure 114.

In one example shown in FIG. 3, the cooling system 100 can be installed on a building to cool dry, inside air within the building via evaporative cooling. In this example, the cooling system 100 can include: a working fluid duct 160; a product air duct sharing a common boundary wall with the working fluid duct 160; a working fluid blower (e.g., a first ducted fan) coupled to an inlet of the working fluid duct 160; and a product air blower (e.g., a second ducted fan 140) coupled to an inlet of the product air duct. In this example, the common boundary wall can define an aperture and a cooling unit 102 and can be installed in the aperture with the base 112 of the cooling unit 102 inline (e.g., flush) with and sealed against the aperture. Furthermore, in this example, the cooling system 100 can include a water supply 150 configured to actively or passively supply water to the coated (i.e., wet side) heatsink of the cooling unit 102. Thus, during operation: the water supply 150 can supply water to the coated (i.e., wet side) heatsink of the cooling unit 102 such that pores of the coating 120 absorb water or draw this water across the surface of the coated heatsink; the working fluid blower draws outside air (i.e., the "working fluid") into the working fluid duct 160 and across the coated heatsink; this outside air draws water off the coated heatsink, thereby evaporatively cooling the coated heatsink and inducing a thermal gradient across the cooling unit 102; the product air blower draws air from inside the building (i.e., the "product air") into the product air duct and across the uncoated heatsink, which draws heat out of this product air and cools the product air due to the thermal gradient across the cooling unit 102. Therefore, in this example, the cooling unit 102 can cool the product air—to a temperature slightly greater than the wet-bulb temperature of the inbound working fluid (i.e., ambient air)—without adding moisture to the product air by evaporating moisture from the first heatsink into a working fluid drawn through the working fluid duct 160.

In the foregoing example, the working fluid duct 160 can also include a pre-cooling duct upstream of the cooling unit 102 and configured to pre-cool the working fluid, as shown in FIG. 4. Thus, in this example, the cooling system 100 can cool the product air—to a temperature approaching the dew point of the inbound working fluid (i.e., ambient air)—via M-cycle cooling without adding moisture to the product air.

Additionally or alternatively, the cooling unit 102 can include a secondary uncoated heatsink adjacent and upstream of the first heatsink, as shown in FIG. 2. In this example, the first heatsink can cool the secondary uncoated heatsink, which can pre-cool the working fluid—to a temperature approaching the dew point of the inbound working fluid (i.e., ambient air)—via M-cycle-type cooling—without turning the working fluid between pre-cooling and cooling zones, thus increasing pumping efficiency of the cooling system 100, while enabling the working fluid to reach sub wet-bulb temperatures.

Therefore, by including both coated and uncoated heatsink structures 114 formed of a singular conductive substrate 110, the cooling unit 102 can implement evaporative and indirect cooling methods to cool fluids and/or materials with increased efficiency by increasing evaporative efficiency and decreasing pressure loss, complexity, weight, and/or size of the cooling system 100.

4. Substrate

Generally, the cooling unit 102 includes a substrate 110 defining a unitary structure formed of a thermally-conductive material and defining: a base 112; and a heatsink structure 114 (e.g., a set of fins) extending from the base 112 of the substrate 110. The cooling unit 102 further includes the porous, hydrophilic coating extending over surfaces (e.g., all surfaces, select surfaces) of the substrate 110, including surfaces of the heatsink structure 114 and/or surfaces of the base 112.

In one implementation, the cooling unit 102 includes a substrate 110 defining a unitary structure formed of a thermally-conductive material and defining: a base 112; a first heatsink structure 114 (e.g., a first set of fins) extending from the base 112 of the substrate 110, and a second heatsink structure 114 (e.g., a second set of fins) extending from the base 112 of the substrate 110. In this implementation, the cooling unit 102 includes the porous, hydrophilic coating extending over surfaces of the first heatsink structure 114, such that the heatsink structure 114 includes coated regions (i.e., the first heatsink structure 114) and uncoated regions (i.e., the second heatsink structure 114).

As described in U.S. patent app. Ser. No. 16/574,048, filed on 17, Sep. 2019—which is incorporated in its entirety by this reference—the substrate no exhibits a high thermal conductivity and is configured to dissipate heat from a heat source (e.g., transfer heat from a heat source to an exterior surface of the substrate no thermally coupled to the substrate no.) A coating 120 deposited over surfaces of the substrate no to increase hydrophilicity of the substrate 110 may decrease thermal conductivity of the heatsink. Therefore, a material exhibiting high thermal conductivity can be machined or molded to form the substrate no in order to maximize the thermal conductivity of the cooling unit 102 after addition of the coating 120 to surfaces of the substrate 110.

The thermally-conductive substrate no can exhibit a porous structure and define an open network of pores 116 extending between surfaces of the substrate 110, including the base 112 and the heatsink structure 114. The substrate no can include pores, in the open network of pores 116, exhibiting volumes within a particular range of volumes such that these pores are permeable to air (e.g., air can flow freely through pores in the open network of pores 116) and can be coated by the porous, hydrophilic coating to increase hydrophilicity of these pores. Additionally and/or alternatively, these pores can exhibit volumes—when lined with the coating 120—such that moisture (e.g., water) can be absorbed through the pores via capillary action, while larger molecules contained in oils and other contaminants cannot travel through the pores. For example, the substrate no can define an open network of pores 116 including pores exhibiting pore diameters between 275-microns and 325-microns such that sufficient capillary pressure is generated for water to flow through the open network of pores 116. In a similar example, the substrate 110 defines the open network of pores 116 exhibiting a pore size less than 400 microns, and the coating 120 defines a thickness between 50 microns and 200 microns to yield an effective pore size less than 100 microns on walls of the open network of pores 116 in the substrate 110. The substrate no and the coating 120—can therefore cooperate to wick moisture (e.g., sweat) across surfaces of the first (coated) heatsink structure 114 via the open network of pores 116 (e.g., via capillary action).

In one implementation, the substrate 110 can be formed from a thermally—conductive foam such as: aluminum foam, copper foam, or graphite foam. For example, the substrate 110 can be machined from a block of graphite foam, the graphite foam exhibiting high thermal conductivity and low density. In another implementation, the substrate 110 can be molded from a metallic material, such as aluminum or copper.

5. Coating

The cooling unit 102 includes a coating 120 lining surfaces of the substrate 110 and the walls of pores in the networks of pores within the substrate 110. Generally, the coating 120 functions as a hydrophilic shell cooperating with the substrate no to enable moisture wicking across a contact surface of the coating 120, through the open network of pores 116 of the substrate 110, and across an evaporative surface of the coating 120, and to provide durability to the substrate structure. The coating 120 can define a cementitious mixture exhibiting high water concentration such that the water molecules in the coating 120 attract water molecules in moisture passing through the open network of pores 116 within the substrate 110, therefore exhibiting hydrophilic properties. The coating 120 also functions as a contaminant resistant layer to prevent contaminants such as oils from clogging the open network of pores 116.

The coating 120 can define a thin shell of approximately uniform thickness that: extends across exterior surfaces of the substrate 110 (e.g., including surfaces of the heatsink structure 114 and the base 112); and lines the walls of the open network of pores 116 within the substrate 110. In particular, the coating 120 can be of at least a minimum thickness across the surfaces of the substrate 110 in order to increase durability of the substrate 110 and increase resistance of the substrate 110 to oils and other contaminants. The coating 120 can be less than a maximum thickness in order to maintain the open network of pores 116 within the substrate 110 and preserve the heat exchanger properties of the structure provided by the substrate 110, as the coating 120 is less thermally-conductive than the substrate 110. For example, the cooling unit 102 can include a substrate 110 machined from a graphite foam material and exhibiting a first impact resistance. The cooling unit 102 can also include the coating 120: defining a cementitious matrix and exhibiting a second impact resistance greater than the first impact resistance, such that the coating 120 increases a durability of the cooling unit 102; and exhibiting a thickness between 75-microns and 125-microns.

Furthermore, the coating 120 defines a void network configured to filter hydrophobic molecules and increase the hydrophilicity of the coating 120 and thereby the coated substrate 110. The coating 120 can define the void network including: micropores that wick water through the coating 120, and that exhibit a first size smaller than pores in the network of pores 116; and nanopores that are hydrated at standard conditions to increase the hydrophilicity of the coating 120, and that exhibit a second size smaller than the first size such that larger hydrophobic molecules cannot displace water in the hydrated nanopores. The coating 120—defining this void network—lines the network of pores 116 of the substrate 110 to wick moisture through the coating 120 while larger pores in the network of pores 116 provide an increased heat exchange surface and enable airflow through the cooling unit 102.

6. Coated Heatsink Structure

In one implementation, as shown in FIGS. 1, 10A, 10B, and 12-14, the cooling unit 102 includes: the substrate 110 defining a base 112, a coated heatsink structure 114 extending from the base 112, and an open network of pores 116 extending between surfaces of the substrate 110; and a coating 120 defining a porous, hydrophilic material extending over surfaces of the substrate 110 including exterior surfaces of the heatsink structure 114, surfaces of the base 112, and surfaces of the open network of pores 116 within the substrate 110, such that the coating 120 is applied to the entire substrate 110. Therefore, in this implementation, the cooling unit 102 defines: a porous, thermally-conductive structure with a network of pores 116 encased in a rigid, hydrophilic shell (i.e., the coating 120) that exhibits greater affinity to polar substances (e.g., water) than to non-polar substances (e.g., oil).

In this implementation, the coating 120 can extend over surfaces of the unitary substrate 110 including surfaces of the base 112 and surfaces of the heatsink structure 114 extending from the base 112. Alternatively, in one variation, the base 112 can exclude the coating 120, such that the base 112 forms a boundary between the (coated) heatsink structure 114 and an exterior surface (e.g., a fluid duct wall) coupled to the base 112.

Alternatively, as described below, the cooling unit 102 can include coated heatsink structures 114 and uncoated heatsink structures 114 (e.g., heatsink structures 114 absent the coating 120).

6.1 Configuration 1: Direct & Indirect Cooling—Coated Heatsink

In a first configuration, as shown in FIGS. 1, 10A, and 10B, the cooling unit 102 can be configured to include a coated heatsink structure 114 configured to directly cool a working fluid (e.g., air), flowing in a single direction over the cooling unit 102, via evaporative cooling.

For example, the coated heatsink structure 114 can define a first end and a second end, opposite the first end, such that air flows from the first end toward the second end across the coated heatsink structure 114. In this example, air flowing across the first end of the heatsink structure 114 is a warm, dry air. As the air continues flowing across the heatsink structure 114, moisture present in the coated heatsink structure 114 evaporates into the air, thereby cooling the coated heatsink structure 114 while both cooling and humidifying air flowing over the coated heatsink structure 114. Thus, air flowing across the second end of the coated heated structure is a cool, humid air.

Further, in this first configuration, the cooling unit 102 can also indirectly cool the fluid (e.g., air) via contact between the working fluid (e.g., air) and surfaces of the coated heatsink structure 114. In particular, in the first configuration, the coated heatsink structure 114 can: communicate thermal energy from a working fluid (e.g., air), flowing over the coated heatsink structure 114, into the coated heatsink structure 114 to cool the working fluid; and release thermal energy via evaporation of moisture, contained in pores of the coating 120, into the working fluid flowing over the coated heatsink structure 114 to cool this coated heatsink structure 114 and the working fluid.

Therefore, this singular coated heatsink structure 114 can (approximately) simultaneously cool air flowing over the coated heatsink by transferring heat from air into the heatsink structure 114 and humidify and further cool the air via evaporation of moisture from surfaces of the heatsink structure 114 into the air. By both directly and indirectly cooling air, the coated heatsink structure 114 enables air flowing over the coated heatsink structure 114 to reach lower temperatures while minimizing humidity added to the air. Thus, as shown in FIG. 15, the cooling unit 102, in the first configuration, can be configured to regulate a temperature of air flowing through the heatsink structure 114 down to sub wet-bulb temperatures.

Further, based on the distribution of moisture (e.g., water) throughout the heatsink structure 114, the heatsink structure 114 can include regions exhibiting higher proportions of sensible cooling to evaporative cooling—such as in regions that are relatively dry—and regions exhibiting higher proportions of evaporative cooling to sensible cooling—such as in regions that are relatively wet (e.g., containing moisture).

6.1.1 Moisture Gradient

Further, in this first configuration, as the working fluid (e.g., air) continues flowing over the coated heatsink structure 114, the coated heatsink structure 114 and the fan 140, pulling air across the coated heatsink structure 114, can cooperate to induce a particular moisture gradient defining a distribution of moisture (e.g., water), contained in pores of the coating 120, across the coated heatsink structure 114. In particular, as the working fluid (e.g., air) flows in a set direction, from a first end of the heatsink structure 114 toward a second end of the heatsink structure 114, moisture contained in the pores of the coating 120 is moved, by the working fluid, within the coating 120 toward the second end, thereby decreasing concentration of moisture toward the first end of the coated heatsink and increasing concentration of moisture toward the second end of the coated heatsink. Further, as the dry working fluid (e.g., dry air) initially contacts the coated heatsink proximal the first end, moisture present in the coated heatsink proximal the first end is evaporated into the dry working fluid, thereby further reducing concentration of moisture toward the first end of the coated heatsink. However, as the working fluid continues flowing over the coated heatsink structure 114 and continues collecting moisture, the working fluid collects moisture from the coated heatsink structure 114 at a lower rate, thereby enabling the regions of the heatsink structure 114 proximal the second end to maintain higher concentrations of moisture relative to regions of the heatsink structure 114 proximal the first end.

Therefore, over time, the heatsink structure 114 can define a moisture gradient defining concentrations of moisture across regions of the coated heatsink structure 114. Thus, in regions exhibiting a relatively low concentration of moisture, the coated heatsink structure 114 can behave as an "uncoated" heatsink structure 114 and cool the working fluid (e.g., air) via indirect cooling. In regions exhibiting a relatively high concentration of moisture, the coated heatsink structure 114 can cool the working fluid via direct cooling. More specifically, regions exhibiting relatively low concentrations of moisture can exhibit higher proportions of sensible cooling compared to evaporative cooling, while regions exhibiting relatively high concentrations of moisture can exhibit higher proportions of evaporative cooling compared to sensible cooling.

For example, a cooling system 100 can include: a coated heatsink structure 114 in the first configuration; and a fan 140 configured to draw a working fluid (e.g., air) across the coated heatsink structure 114. The coated heatsink structure 114 can include: a first region (e.g., a first portion of the coated heatsink structure proximal an inlet of the cooling unit 102) extending from a first side of the base 112 and along a first portion of the base 112; and a second region (e.g., a second portion of the coated heatsink structure proximal an outlet of the cooling unit 102) extending from the first side of the base 112 and along a second portion of the base 112. The coating 120 can extend across surfaces of the first and second regions of the heatsink structure 114. In this example, the fan 140 can be configured to draw the working fluid across the heatsink structure 114 in the first direction, from the first region toward the second region of the heatsink structure 114. When the fan 140 is activated, thereby enabling flow of the working fluid over the coated heatsink structure 114 in the first direction, the coated heatsink structure 114, the coating 120, and the fan 140 can cooperate to induce a moisture gradient (e.g., a water distribution) across the heatsink, the moisture gradient defining: a first concentration of moisture in the first region of the heatsink structure 114; and a second concentration of moisture in the second region of the heatsink structure 114, the second concentration less than the first concentration.

Therefore, the first region of the heatsink structure 114 can: communicate thermal energy from the working fluid, flowing over the first region of the heatsink structure 114, into the heatsink structure 114 at a first indirect cooling rate; and release thermal energy via evaporation of moisture into the working fluid, flowing over the first region of the heatsink structure 114, at a first direct cooling rate. Further, the second region of the heatsink structure 114 can: communicate thermal energy from the working fluid, flowing over the second region of the heatsink structure 114, into the heatsink structure 114 at a second indirect cooling rate, less than the first indirect cooling rate; and release thermal energy via evaporation of moisture into the working fluid, flowing over the second region of the heatsink structure 114, at a second direct cooling rate greater than the first direct cooling rate.

In one variation, the heatsink structure can be configured to exhibit a particular moisture gradient, such as by selectively distributing water to regions of the heatsink structure. In this variation, by controlling distribution of moisture within the heatsink, proportions of sensible cooling to evaporative cooling in various regions of the heatsink structure can be controlled.

7. Coated+Uncoated Heatsink

In one implementation, as shown in FIGS. 2-6, 7A-7C, 8A-8B, 9A-9B, and 11A, the cooling system 100 can be configured to include a cooling unit 102 including both a coated heatsink structure 114 and an uncoated heatsink structure 114 formed of a unitary, thermally-conductive structure (e.g., the substrate no). The cooling unit 102 can include the coated heatsink structure 114 and the uncoated heatsink structure 114 arranged in series, in parallel, or both.

By selectively applying the hydrophilic coating across surfaces of the thermally-conductive substrate 110, wicking properties (e.g., water transport, water evaporation) of the heatsink structure 114 can be tuned. In particular, the cooling unit 102 can be configured to define hydrophilic zones—where water is absorbed into pores of the coating 120, distributed to coated surfaces of the heatsink structure 114, and evaporated from surfaces of the (coated) heatsink structure 114—and hydrophobic zones including little to no moisture on surfaces of the (uncoated) heatsink structure 114.

For example, the cooling unit 102 can include the substrate 110 defining: a base 112; a first heatsink structure 114 extending from a first side of the base 112; and a second heatsink structure 114 extending from a second side of the base 112 (e.g., adjacent or opposite the first side). The cooling unit 102 can include a coating 120 applied to the first heatsink structure 114 of the substrate 110 to form a coated heatsink structure 114 exhibiting both conductive properties of the substrate 110 and hydrophilic properties of the coating 120. The cooling unit 102 can include the second heatsink structure 114 absent the coating 120 and therefore defining an uncoated heatsink structure 114.

The uncoated heatsink structure 114 can be configured to exhibit hydrophobic properties in order to maintain dry, cool product air moving across the uncoated heatsink structure 114. To improve hydrophobicity of the uncoated heatsink, the substrate 110 can be formed of a material prone to hydrophobicity. For example, the substrate 110 can be formed of a graphite foam configured to adsorb contaminants (e.g., oils) thereby increasing hydrophobicity of the graphite foam substrate 110. Further, the substrate 110 can includes pores, in the network of pores 116, exhibiting volumes sufficiently small such that water cannot enter and/or flow through these pores when hydrophobic (e.g., without the coating 120). Additionally and/or alternatively, the uncoated heatsink structure 114 can include a hydrophobic coating—distinct from the porous, hydrophilic, coating—configured to increase hydrophobicity of the uncoated heatsink structure 114.

The cooling unit 102—forming a unitary contiguous structure including both coated regions (e.g., the coated heatsink structure 114) and uncoated regions (e.g., the uncoated heatsink structure 114) of the heatsink structure 114—may therefore exhibit: high thermal conductivity between the coated heatsink structure 114 and the uncoated heatsink structure 114; high hydrophilicity—and thereby increased moisture wicking—across the coated heatsink structure 114 due to the coating 120; and high hydrophobicity across the uncoated heatsink structure 114 due to absence of the coating 120 on the uncoated heatsink structure 114.

In this implementation, the base 112, the coated heatsink structure 114, and the uncoated heatsink structure 114 can form a unitary structure formed of the substrate material. The coating 112 can be applied to surfaces of the base 112 up to a boundary between the coated and uncoated heatsink structures 114. Alternatively, the base 112 can be uncoated (e.g., excluding the coating 120) to prevent introduction of moisture into the uncoated heatsink structure 114 and/or exterior surfaces contacting the base 112 (e.g., walls of an air duct).

7.1 Configuration 2: Indirect-Direct Cooling—Heatsink Structures in Series

In a second configuration, as shown in FIGS. 2, 8A, and 8B, the cooling unit 102 can be configured to include an uncoated heatsink structure 114 and a coated heatsink structure 114 assembled in series such that a fluid flowing in a single direction over the cooling unit 102 first flows over the uncoated heatsink structure 114—precooling the fluid—and then flows over the coated heatsink structure 114, thereby further cooling and humidifying the fluid.

More specifically, in the second configuration, the cooling unit 102 can include a substrate no defining: a base 112; a first heatsink structure 114 extending from a first face of the base 112; and a second heatsink structure 114 contiguous the first heatsink structure 114 and extending from the first face of the base 112. The cooling unit 102 can also include the porous, hydrophilic coating (e.g., a cementitious coating) extending over surfaces of the first heatsink structure 114 up to a boundary between the first and second heatsink structure 114.

Therefore, in this configuration, the cooling system 100 can be configured to precool a working fluid (e.g., air) flowing over the second heatsink structure 114 (e.g., a hydrophobic uncoated heatsink structure 114) to temperatures approaching the dew point of the working fluid and to humidify the working fluid as it continues flowing over the second heatsink structure 114 (e.g., a coated heatsink structure 114). Further, because there is no distinct product fluid separated from the working fluid in this configuration, the cooling system 100 can be configured to directly cool the working fluid via evaporation of moisture from the first heatsink structure 114 into the product air, thereby increasing the moisture content and relative humidity of the product air supply.

For example, the cooling system 100 can include a cooling unit 102 including a graphite foam substrate 110 defining: a base 112; an uncoated heatsink structure 114 extending outward from a first face of the base 112 and along a first length of the base 112; a coated heatsink structure 114 extending outward from the first face of the base 112 and along a second length of the base 112 contiguous the first length, such that the uncoated and coated heatsink structures 114 are arranged in series. The cooling unit 102 can be configured such that: the uncoated heatsink structure 114 communicates thermal energy from a working fluid (e.g., air), flowing over the uncoated heatsink structure 114, into the coated heatsink structure 114, thereby precooling the working fluid; and the coated heatsink structure 114 releases thermal energy via evaporation of moisture into the cooled working fluid, thereby increasing the relative humidity and further reducing a temperature of the precooled working fluid.

7.2 Configuration 3: Indirect Cooling—Parallel Coated and Uncoated Heatsink Structure In a third configuration, as shown in FIGS. 3 and 7A-7C, the cooling unit 102 can be configured to include both a coated heatsink structure 114 and a non-coated heatsink structure 114, each extending from opposite sides of a base 112 of the substrate 110. More specifically, the cooling unit 102 includes: a substrate 110 (e.g., a unitary graphite foam structure) defining a base 112, a first heatsink structure 114 (or "coated heatsink structure 114") extending from a first side of the base 112, and a second heatsink structure 114 (or "uncoated heatsink structure 114") extending from a second side opposite the first side of the base 112; and a coating 120 (e.g., a porous, hydrophilic coating) extending over surfaces of the coated heatsink structure 114 up to a boundary between the coated heatsink structure 114 and the uncoated heatsink structure 114.

In the third configuration, the coated heatsink structure 114 of the cooling unit 102 can be configured to release thermal energy via evaporation of moisture—contained in pores of the coating 120 and the substrate no—into a working fluid (e.g., a working air supply) flowing over the coated heatsink structure 114. The uncoated heatsink structure 114 can be configured to communicate thermal energy from a product fluid (e.g., a product air supply)—flowing over the uncoated heatsink structure 114 and separated (e.g., by a physical barrier) from the working fluid, into the coated heatsink structure 114. Therefore, as the working fluid flows over the coated heatsink structure 114 and extracts thermal energy and moisture from the coated heatsink structure 114—thus cooling the coated heatsink structure 114 and the working fluid—the dry heatsink structure 114 transfers thermal energy extracted from the product fluid to the wet heatsink structure 114, thus cooling the product fluid. Further, by separating the working fluid from the product fluid and routing the working fluid over the wet heatsink, the cooling system 100 restricts introduction of moisture to the working fluid only while the product fluid remains "dry" (e.g., remains at ambient humidity). Thus, the cooling system 100 can output a cooled product air with no added moisture for cooling a heat source coupled to the cooling system 100.

For example, the cooling system 100 in the third configuration can include a cooling unit 102 including: a singular graphite foam substrate no defining a base 112, a coated heatsink structure 114 extending from a first side of the base 112 and an uncoated heatsink structure 114 extending from a second side of the base 112 opposite the first side of the base 112. The cooling system 100 can further include a manifold configured to house the cooling unit 102 and including: an inlet configured to receive an inlet air supply; a product outlet configured to output a product air supply; and an exhaust outlet configured to release a working air supply. The manifold can further include a diverter configured to: direct a first portion of the inlet air supply—defining the working air supply—into a working fluid duct 160 configured to route the working air supply over the coated heatsink structure 114 and out the exhaust outlet; and direct a second portion of the inlet air supply—defining the product air supply—into a product air duct configured to route the product air supply over the uncoated heatsink structure 114 and out the product outlet. Therefore, the cooling system 100 can be configured to: receive the inlet air supply at a first temperature and a first moisture content via the inlet of the manifold; split the inlet air supply into the working air supply directed toward the working fluid duct 160 and the product air supply directed toward the product air duct via the diverter; flow the working air supply through the working fluid duct 160 over surfaces of the coated heatsink structure 114 to cool the coated heatsink structure 114 via release of thermal energy and evaporation of moisture from the coated heatsink structure 114 into the working air supply; flow the product air supply through the product air duct over surfaces of the uncoated heatsink structure 114 to cool the product air supply via transfer of thermal energy from the product air supply through the uncoated heatsink structure 114 and into the coated heatsink structure 114. The cooling system 100 can then direct the product air supply—now at a second temperature less than the first temperature but maintaining the first moisture content—to the product outlet. The cooling system 100 can release the working air supply—now at a third temperature less than the first temperature and a second moisture content greater than the first moisture content—via the exhaust outlet.

In one implementation, the cooling system 100 can be assembled in the third configuration, as described above, and can include a filter configured to collect and separate the cooled product fluid from the cooled, humidified working fluid. For example, the cooling system 100 can include a filter including: an insert that couples to the product air duct and funnels the product air supply into a storage tank. The working air supply can be released into the atmosphere upon exit via the exhaust outlet. In another example, the cooling system 100 can include a filter including a barrier blocking an exit of the working air supply. The working air can instead flow upward (normal to flow of the product air supply) and into the atmosphere while the product air supply is permitted to freely flow through an outlet for collection and/or cooling of a heat source. In this example, the cooled and humidified working air can continue to cool the dry product air within the product air duct.

As shown in FIGS. 7A-7C, the cooling system 100 can include: a set of cooling units 102 in the third configuration.

7.2.1 Configuration 4: Indirect-Direct Cooling—Precooling the Working Fluid

In a fourth configuration, as shown in FIG. 4, the cooling system 100 can be configured to precool the working fluid before flowing over the wet heatsink structure 114 of the cooling unit 102. In the fourth configuration, the cooling unit 102 can be assembled as described above in the third configuration. However, the working fluid duct 160 can be coupled to a pre-cooling duct upstream of the cooling unit 102 and configured to pre-cool the working fluid before reaching the working fluid duct 160. The pre-cooling duct can be configured to communicate the working fluid in a first direction opposite a second direction of fluid flow in the working fluid duct 160, the pre-cooling duct and the working fluid duct 160 forming a closed loop. By precooling the working fluid upstream of the cooling unit 102, the cooling unit 102 enables further cooling of the working fluid to temperatures below the wet bulb temperature and approaching the dew point via M-cycle cooling.

For example, the cooling system 100 can include a cooling unit 102 including a graphite structure defining: a base 112; a coated heatsink structure 114 extending from a first side of the base 112; and an uncoated heatsink structure 114 extending from a second side of the base 112 opposite the first side of the base 112. The cooling system 100 can include a set of ducts configured to receive a fluid supply including: a pre-cooling duct upstream the cooling unit 102 and configured to transport a working fluid flowing in a first direction for pre-cooling; a working duct coupled to the pre-cooling duct and configured to transport the working fluid in a second direction opposite the first direction across surfaces of the coated heatsink structure 114 for cooling; and a product air duct separated from both the pre-cooling duct and working fluid duct 160 and configured to transport a product fluid in the first direction for cooling. Therefore, in this example, as the working fluid flows through the pre-cooling duct, the coated heatsink structure 114 indirectly extracts thermal energy from the working fluid via working fluid flowing through the working fluid duct 160 and over the coated heatsink structure 114, thus cooling the working fluid in the pre-cooling duct without increasing absolute humidity of this working fluid. Then, this cooled working fluid is turned (e.g., via a 90 degree elbow) to flow through the working fluid duct 160 and over surfaces of the coated heatsink structure 114, further decreasing temperature of the working fluid while increasing relative humidity of the working fluid. By pre-cooling the working fluid within the pre-cooling duct, the working fluid in the working fluid duct 160 can reach temperatures approaching the dew point. As the temperature of the working fluid flowing over the coated heatsink structure 114 is further decreased, the product fluid flowing through the product air duct and over the uncoated heatsink structure 114 further decreases in temperature (e.g., dry bulb or ambient temperature).

7.3 Configuration 5: Indirect-Direct-Indirect Cooling—Parallel Heatsink Structures in Series In a fifth configuration, as shown in FIGS. 5 and 9A-9B, the cooling unit 102 can be configured to include both an uncoated heatsink structure 114 and a coated heatsink structure 114, each extending from a first face of the base 112 to both precool the working fluid as it flows over the uncoated heatsink structure 114 and further cool the working fluid as it continues flowing over the coated heatsink structure 114—thereby indirectly cooling a product fluid flowing over the uncoated heatsink structure 114 extending from a second face of the base 112 opposite the first face and along a length of the base 112 corresponding to a combined length of the uncoated heatsink structure 114 and coated heatsink structure 114 extending from the first face.

More specifically, the cooling unit 102 in the fifth configuration can include a substrate 110 (e.g., a unitary graphite foam structure) defining: a base 112; the first (coated) heatsink structure 114 extending from a first face of the base 112 and along a first length of the base 112; and the second (uncoated) heatsink structure 114 extending from a second face of the base 112 and along a second length of the base 112 overlapping the first length, as in the first and fourth configuration. The cooling unit 102 can further include: a third (uncoated) heatsink structure 114 extending from the first face of the base 112 and adjacent and upstream the first heatsink structure 114; and a fourth (uncoated) heatsink structure 114 extending from the second face of the base 112 and adjacent and upstream the second heatsink structure 114. The cooling unit 102 can further include the porous, hydrophilic coating: extending over surfaces of the first heatsink structure 114 up to a boundary between the first heatsink structure 114 and the second heatsink structure 114 and up to a boundary between the first heatsink structure 114 and the third heatsink structure 114. The cooling system 100 can be configured to cool a product fluid flowing over surfaces of the uncoated, second and fourth heatsink structures 114 assembled in series while cooling and humidifying a working fluid flowing over surfaces of the uncoated, third heatsink structure 114 and the coated, first heatsink structure 114.

Therefore, the first (coated) heatsink structure 114 can cool the third (uncoated) heatsink structure 114, which can pre-cool the working fluid—to a temperature approaching the dew point of the inbound working fluid (i.e., ambient air)—via M-cycle-type cooling without needing to turn the working fluid between pre-cooling and the fourth (coated) heatsink structure 114 (e.g., defining a cooling zone) and thus increasing pumping efficiency of the cooling system 100.

7.4 Configuration 6: Indirect-Direct Cooling—Parallel Coated and Uncoated Heatsink Structures +Thermally-Isolated, Coated Heatsink Structure In a sixth configuration, as shown in FIG. 6, the cooling unit 102 can be configured to include: a coated heatsink structure 114, extending from a first face of the base 112, configured to cool and humidify a working fluid (e.g., air) flowing over the coated heatsink structure 114; an uncoated heatsink structure 114 extending from a second face of the base 112, opposite the first face, and configured to pre-cool a product fluid (e.g., air) flowing over the uncoated heatsink structure 114; and a thermally-isolated, coated heatsink structure 114 configured to receive the product fluid from the uncoated heatsink structure 114 for further cooling and humidification. In this sixth configuration, the thermally-coupled coated and uncoated heatsink structures 114 can cooperate to generate a cool, dry product fluid—as described in the third configuration above)—while cooling and humidifying the working fluid. This cool, dry product fluid can then be directed toward the thermally-isolated, coated heatsink structure 114 for further cooling via contact with this cool, coated heatsink structure 114 and evaporation of moisture from surfaces of the coated heatsink structure 114, as described in the first configuration above.

Further, in one variation, the cooling system 100 can include a set of cooling units 102 arranged in a cascading series, such that the final product fluid is a cool, dry product fluid approaching dew-point temperatures. For example, as shown in FIG. 11A, the cooling system 100 can include: a first cooling unit 102 in the third configuration; a second cooling unit 102 in the third configuration; and a third cooling unit 102 in the third configuration. However, in this example, the coated heatsink structure 114 of the second cooling unit 102 (e.g., in the third configuration), can be configured to receive a portion of the product exiting the first cooling unit 102—while remaining thermally isolated from the heatsink structures 114 of the first cooling unit 102— thereby enabling the coated heatsink structure 114 of the first cooling unit 102, the uncoated heatsink structure 114 of the first cooling unit 102, and the coated heatsink structure 114 of the second cooling unit 102 to cooperate to behave as a cooling unit 102 in the sixth configuration. Similarly, the coated heatsink structure 114 of the second cooling unit 102, the uncoated heatsink structure 114 of the second cooling unit 102, and the coated heatsink structure 114 of the third cooling unit 102 can cooperate to behave as an additional cooling unit 102 in the sixth configuration.

In this example, inlet air can initially be fed to the first cooling unit 102. The inlet air can be separated into a working fluid, directed through a working fluid duct 160, and a first product fluid, directed through a first product fluid duct 162. The first cooling unit 102 can be arranged such that the coated heatsink structure 114 extends into the working fluid duct 160 and the uncoated heatsink structure 114 extends into the first product fluid duct 162. Therefore, as the working fluid flows over the coated heatsink structure 114, of the first cooling unit 102, in the working fluid duct 160 and the first product fluid flows over the uncoated heatsink structure 114, of the first cooling unit 102, in the first product fluid duct 162, the working fluid is cool and humidified and the first product fluid is cooled while remaining dry. The cooled (e.g., approaching wet-bulb temperatures), humidified working fluid can then be released into the atmosphere or directed toward a heat source (e.g., air, a machine) for cooling of the heat source.

This first product fluid, flowing through the first product fluid duct 162, can then (again) be separated, such that a first portion of the first product fluid duct 162 continues flowing through the first product fluid duct 162, and a second portion—defining a second product fluid—continues flowing through a second product fluid duct 162. The second cooling unit 102 can be arranged such that the coated heatsink structure 114 extends into the first product fluid duct 162 and the uncoated heatsink structure 114 extends into the second product fluid duct 162. Therefore, as the first product fluid flows over the coated heatsink structure 114, of the second cooling unit 102, in the first product fluid duct 162, and the second product fluid flows over the uncoated heatsink structure 114, of the second cooling unit 102, in the second product fluid duct 162, the first product fluid is cooled and humidified and the second product fluid is cooled while remaining dry. The cooled (e.g., approaching dew-point temperatures), humidified, first product fluid can then be released into the atmosphere or directed toward a heat source (e.g., air, a machine) for cooling of the heat source.

Similarly, this second product fluid, flowing through the second product fluid duct 162, can then (again) be separated, such that a first portion of the second product fluid continues flowing through the second product fluid duct 162, and a second portion—defining a third product fluid—continues flowing through a third product fluid duct 162. The third cooling unit 102 can be arranged such that the coated heatsink structure 114 extends into the second product fluid duct 162 and the uncoated heatsink structure 114 extends into the third product fluid duct 162. The third cooling unit 102 can therefore be configured to cool and humidify the second product fluid and cool the dry, third product fluid. This dry, cool (e.g., approaching dew-point temperatures), product fluid can then be leveraged to cool a heat source, such as air within an interior space or a machine. Additionally and/or alternatively, the dry product fluid can be directed toward additional cooling units 102 for further cooling of the dry, cool, product fluid.

8. Moisture in the Cooling System

The cooling unit 102 can include a coated heatsink structure 114 configured to distribute moisture throughout pores of the coating 120 lining external surfaces of the substrate no and walls of the network of pores 116 extending between surfaces of the substrate 110. The coated heatsink structure 114 cools fluid flowing over surfaces of the cooling unit 102 via evaporation of moisture from surfaces of the coated heatsink structure 114 (e.g., contained within pores of the coating 120). Therefore, to increase efficiency of evaporative cooling, the cooling system 100 can include a water supply 150 coupled to the cooling unit 102 and configured to supply water to the coated heatsink structure 114 in the cooling unit 102. By increasing moisture supplied to the coated heatsink structure 114, the coated heatsink structure 114 can more efficiently distribute moisture throughout pores of the coating 120 and increase efficiency of evaporative cooling.

In one implementation, water can be dripped down (e.g., via gravity) through the coating 120 of the wet heatsink structure 114, such as by a human user squeezing a sponge over the wet heatsink structure 114. Alternatively, in another implementation, water can be sprayed down through the coating 120 of the wet heatsink structure 114, such as by a water sprayer installed above the cooling unit 102.

In yet another implementation, the cooling system 100 can include a set of supply channels 152 integrated into the heatsink structure 114 and coupled to a water supply 150. These channels can be configured to release moisture into the coated heatsink structure 114 as water travels from the water supply 150 and through the supply channels 152 within the heatsink structure 114. For example, the cooling unit 102 can include a set of supply channels 152 (e.g., fenestrated channels) extending between surfaces of the substrate 110. The set of supply channels 152 can be configured to communicate water, from the water supply 150, through the substrate 110 to release moisture into the heatsink structure 114 via perforations in the set of supply channels 152.

Further, in this example, as moisture evaporates from surfaces of the (coated) heatsink structure 114, the heatsink structure 114 is cooled, thereby enabling cooling of water flowing through the set of supply channels 152 via transfer of heat from water into the heatsink structure 114. This (excess) cooled water—not absorbed by the coated heatsink structure 114—can then be directed from an outlet of the cooling unit 102 toward a heat source (e.g., air or a machine) for cooling of the heat source via transfer of heat from the heat source into the water (i.e., a heat transfer fluid). Therefore, in this implementation, the coated substrate 110 and/or heatsink structure 114 can: absorb sufficient volumes of water, flowing through the supply channels 152, to enable evaporation of moisture from surfaces of the heatsink structure 114 into a working air supply flowing over the heatsink structure 114; and cool excess water—not absorbed by the heatsink structure 114 and flowing through the supply channels 152—for cooling of an external heat source (e.g., air, a machine) via transfer of heat from the heat source into the water.

9. Cooling System Variations

The cooling system 100 can be configured to cool various types of heat sources (e.g., air, refrigerant, a human body). As shown in FIGS. 1-14, the cooling system 100 can include a cooling unit 102 assembled in a particular configuration based on the type of heat source. For example, a cooling system 100 configured to cool a human user can be assembled in the third configuration. In another example, the cooling system 100 can be assembled in the second configuration and configured to cool a condenser 130 in an air conditioning unit.

In each of these variations, the cooling system 100 can include multiple cooling units 102 arranged in parallel, these units forming an array of cooling units 102. As shown in FIGS. 7A, 8A, and 9A, adjacent parallel cooling units 102 can be arranged such that: coated heatsink structures 114 face other coated heatsink structures 114, thereby forming a set of wet channels; and uncoated heatsink structures 114 face other uncoated heatsink structures 114, thereby forming a set of dry channels through which the product air supply flows. By including multiple cooling units 102, the cooling system 100 can further increase efficiency and increase cooling of a working and/or product fluid output by the cooling system 100. In one implementation, in order to prevent damage and/or breakage of these adjacent, parallel cooling units 102, cooling units 102 can be segmented (or "divided") such that each cooling unit 102 defines a subset of cooling unit 102 sections. In this implementation, individual sections of each cooling 102 can be removed for inspection, maintenance, and/or replacement.

Further, in each of these variations, the cooling system 100 can include: a fan 140 and/or a blower configured draw air through the cooling unit 102 and across the heatsink structure 114; and a water supply configured to supply moisture to the (coated) heatsink structure 114. Alternatively, in one variation, the cooling system 100 can include a cooling unit 102 configured to draw air through the cooling unit 102 and across the heatsink structure 114 via movement of the cooling unit 102. In this variation, the cooling unit 102 can be configured to define a particular structure or shape—such as an airfoil—configured to move when air is drawn through the cooling unit 102. For example, the cooling system 100 can include a motor—coupled to the cooling unit 102—configured to supply power to move the cooling unit 102, thereby generating airflow through the cooling unit 102. Alternatively, in another example, movement (e.g., rotation) of the cooling unit 102 can be powered by wind.

9.1 Variation: HVAC

In one variation, the cooling system 100 can be integrated into an HVAC system. In this variation, the cooling system 100 100 can be assembled in the third, fourth, or fifth configuration to generate a cool, dry product air. For example, the cooling system 100 can be assembled in the third configuration such that the cooling unit 102 can cool the product air—to a temperature slightly greater than the wet-bulb temperature of the inbound working fluid (i.e., ambient air)—without adding moisture to the product air. Alternatively, the cooling system 100 can be assembled in the fourth configuration or the fifth configuration described above, such that the working fluid is precooled prior to flowing over surfaces of the coated heatsink structure 114 and the product fluid is cooled without adding moisture to the product fluid. The cooling system 100 can therefore cool the product air—to a temperature approaching the dew point of the inbound working fluid (i.e., ambient air)—without adding moisture to the product air. Therefore, when integrated into the HVAC system, the cooling system 100 can generate cool air and maximize efficiency of the HVAC system, including eliminating a need for a compressor within the HVAC system.

9.2 Variation: Cooling Unit+Condenser

In another variation, the cooling system 100 can include a cooling unit 102 thermally coupled to a condenser 130. For example, the cooling unit 102 can be installed within an air duct fluidly coupled to a condenser 130. The cooling system 100 can include a fan 140 configured to draw air through the air duct, over the heatsink structure 114 of the cooling unit 102, and across coils of the condenser 130. In particular, the cooling unit 102 can be configured to cool the working fluid via direct and/or indirect cooling by the heatsink structure 114 (e.g., coated and/or uncoated) and output a cooled air toward the condenser 130. The condenser 130 can include a set of coils 132 and be configured to: receive the working fluid from the cooling unit 102 fluidly coupled to the condenser 130; and communicate thermal energy from a product fluid (e.g., refrigerant), flowing through the set of coils 132, into the working fluid (e.g., air), flowing over the set of coils 132. Therefore, by installing the cooling unit 102 in a pathway of air flowing toward the condenser 130, the cooling system 100 can increase efficiency of the condenser 130 by reducing temperature of the air flowing toward the condenser 130 and increasing heat capacity of this air, thereby enabling air flowing over the condenser 130 (e.g., the set of coils 132) to extract heat from the product fluid (e.g., refrigerant)—flowing through the set of coils 132 of the condenser 130—at a higher rate.

In one implementation, the cooling unit 102 can be assembled in the second configuration, including the coated and uncoated heatsink structures 114 assembled in series. The cooling system 100 can include a fan 140 at a first end of the cooling unit 102 adjacent the uncoated heatsink structure 114 and configured to blow cool air across surfaces of the uncoated and coated heatsink structures 114 toward a second end of the cooling unit 102. As the fan 140 blows air across the cooling unit 102, the uncoated heatsink structure 114 communicates thermal energy from the air into the adjacent coated heatsink structure 114, thereby precooling the air supply. As this precooled air supply continues flowing across the cooling unit 102, the coated heatsink structure 114 releases thermal energy via evaporation of moisture into the air supply, thereby humidifying and further cooling the air supply (i.e., the working fluid).

Additionally, in another variation, the cooling system 100 can be configured to reduce a load of the condenser 130 by further cooling fluid exiting the condenser 130, thereby reducing a load and increasing efficiency of the condenser 130. For example, as the air supply (i.e., a working fluid) is blown across the cooling unit 102, refrigerant (i.e., a product fluid) exiting a condenser 130 coupled to the cooling system 100 can be routed through a set of tubes embedded within the substrate no. As the coated heatsink structure 114 evaporates water into the air supply, the coated heatsink structure 114 and refrigerant flowing through the set of tubes within the substrate 110 are cooled. Therefore, the cooling system 100 can be coupled to a condenser 130 (e.g., within an air conditioning system) to further cool refrigerant cooled by the condenser 130 in order to reduce a load of the condenser 130.

9.3 Variation: Evaporative Condenser

In one variation, the cooling system 100 can be configured to function as an evaporative condenser 130, such as within an air conditioning system.

For example, the cooling unit 102 can be assembled in the second configuration and configured to cool a refrigerant via evaporative cooling. As described above, the cooling system 100—in the second configuration—can produce a working fluid exhibiting temperatures below the wet bulb temperature of the working fluid and/or approaching the dew point with increased humidity. In this example, the cooling unit 102 can include the substrate 110 including a set of fluid channels 170 (e.g., tubes) embedded into the substrate 110 configured to transport refrigerant through the set of fluid channels 170 for cooling. The cooling unit 102—in the second configuration—absorbs heat from air flowing over the uncoated heatsink structure 114, cooled by the coated heatsink structure 114 adjacent the uncoated heatsink structure 114 in series, thus pre-cooling the air. The cooling unit 102 then releases this thermal energy via evaporation of moisture into the air as it flows over the coated heatsink structure 114. As the coated heatsink structure 114 evaporates moisture into the air, cooling both the air and the coated heatsink structure 114, the refrigerant flowing through the tubes within the substrate no is also cooled. In another example, the cooling unit 102 can be configured to include only the coated heatsink structure 114, as described in the first configuration, such that the entire substrate 110 includes the porous, hydrophilic coating.

More specifically, in each of the preceding examples, the cooling system 100 can include a cooling unit 102 including: a base 112; a heatsink structure 114 (e.g., fully coated, partially coated) extending from the base 112; a coating 120 extending across surfaces (e.g., all surfaces or regions of the heatsink structure 114) of the substrate no; and a set of fluid channels 170 extending through the substrate 110 and configured to transport a product fluid (e.g., refrigerant) through the substrate 110. The cooling unit 102 can also include a fan 140 configured to draw air in a first direction, from a first end of the heatsink structure 114 toward a second end of the heatsink structure 114, across the heatsink structure 114. Further, the set of fluid channels 170 can: define an inlet section and an outlet section opposite the inlet section within the heatsink structure 114; and be configured to transport the product fluid in a first direction through the substrate 110 from the inlet section toward the outlet section. Therefore, the heatsink structure 114 can be configured to: receive air, at the first end, exhibiting temperatures within a first temperature range and humidities within a first humidity range; output air, at the second end, exhibiting temperatures within a second temperature range, less than temperatures within the first temperature range, and humidities within a second humidity range, exceeding humidities within the first humidity range; receive the product fluid (e.g., refrigerant), at the inlet section, in a vapor phase and exhibiting temperatures within a third temperature range; and output the product fluid, at the outlet section, in a liquid phase and exhibiting temperatures within a fourth temperature range less than temperatures within the third temperature range.

The cooling system 100 can therefore increase efficiency of cooling of the refrigerant (e.g., within an HVAC system) by eliminating distinct evaporator and condenser 130 components and instead directly condensing refrigerant within the cooling unit 102.

Variation: Helmet

In one variation, the cooling system 100 can be integrated into or define a helmet (e.g., a motorcycle helmet) configured to be worn over the head of a human user. For example, the helmet can include a vent extending across a top of a body of the helmet and configured to enable airflow through the helmet, such as while the human user wears the helmet while riding her bike or motorcycle. The helmet can include a cooling unit 102, in the third configuration, within the body of the helmet, including a substrate 110 defining: a base 112; a coated heatsink structure 114 extending outward from a first face of the base 112; and an uncoated heatsink structure 114 extending outward from a second face of the base 112, the coated and uncoated heatsink structures 114 arranged in parallel. The helmet can further include a diverter configured to separate an inlet air supply into a product air supply routed over the uncoated heatsink structure 114 and a working air supply routed over the coated heatsink structure 114.

Therefore, as the inlet air supply flows through the vent and into the helmet: the coated heatsink structure 114 evaporates moisture (e.g., water, sweat) contained in pores of the coating 120 and the substrate no into the working fluid flowing over the coated heatsink, thereby cooling and increasing relative humidity of the working fluid; and the uncoated heatsink structure 114 communicates thermal energy from the product fluid, flowing over the uncoated heatsink structure 114, into the coated heatsink structure 114 (e.g., due to a temperature gradient between the heatsink structures 114), thereby cooling the product fluid. The humidified, cooled working fluid rises upward (opposite gravity) and out of the helmet through the vent and the product fluid flows out a rear side of the body of the helmet.

In another example, the helmet can include a cooling unit 102, in the fifth configuration, such that the working fluid is precooled before humidification, thereby lowering the wet bulb temperature of the working fluid and enabling the working fluid to reach temperatures approaching the dew point.

In one variation, the helmet can include a fan 140 blowing cooled fluid across the uncoated heatsink structure 114 to further increase cooling of the product fluid below the wet bulb temperature, thereby generating a swirl of cooler air within the helmet. Alternatively, the helmet can include a fan 140 blowing cooled fluid (e.g., cooled air) into the diverter and therefore across both the uncoated heatsink structure 114 and the coated heatsink structure 114, such as to generate an airflow through the helmet while the user rides a stationary bike indoors.

9.5 Variation: Personal Protective Equipment

In one variation, the cooling system 100 can be integrated into personal protective equipment (or "PPE") such as protective clothing, helmets, or other garments configured to protect a human user from bodily injury and/or infection. For example, the cooling system 100 can be integrated into a vest configured to be worn by a human user underneath a hazmat suit. The cooling system 100 can be integrated into the vest and include: a cooling unit 102 assembled in the third configuration, such that the cooling unit 102 includes a coated heatsink structure 114 and an uncoated heatsink structure 114 in parallel; a fan 140 configured to blow cool air across surfaces of the cooling unit 102; an exhaust configured to remove a humidified working fluid from the vest and the hazmat suit; and an outlet configured to disperse the dry cooled product fluid throughout the hazmat suit to cool the human user. Further, the cooling system 100 can include a water supply 150 (e.g., external the hazmat suit) coupled to the coated heatsink structure 114 configured to further increase cooling of the working and product air supply. Alternatively, the cooling unit 102 can be assembled in the second configuration, to further increase cooling of the product air supply via precooling of the working air supply.

10. Closed-Loop Controls

In one variation, the cooling system 100 can include a set of sensors configured to monitor a set of fluid controls, such as temperature and/or humidity of the product fluid (e.g., air) flowing through the cooling unit 102.

For example, the cooling system 100 can include: a cooling unit 102 including a heatsink structure 114 arranged within a fluid duct configured to communicate air across the heatsink structure 114; an air inlet configured to draw air from an exterior environment through the fluid duct; an air outlet configured to release air from the fluid duct (e.g., into the exterior environment or a different surrounding environment); an inlet air temperature sensor installed within the fluid duct proximal the air inlet; an outlet air temperature sensor installed within the fluid duct proximal the air outlet; and an air humidity sensor installed within the fluid duct proximal the air outlet. The cooling system 100 can thus monitor cooling and humidification of air based on measurements recorded by these sensors.

In one implementation, the cooling system 100 can adjust operating parameters—such as flowrates of working, product and/or cooling fluids (e.g., water) into the cooling unit 102—based on these measured fluid controls. For example, the cooling system 100 can include a set of sensors including: an inlet temperature sensor—arranged proximal the first end (i.e., the inlet) of the cooling unit 102—configured to measure an inlet temperature of the product fluid; an inlet humidity sensor—arranged proximal the inlet temperature sensor—configured to measure an inlet humidity of the product fluid; and an outlet temperature sensor—arranged proximal the second end (i.e., the outlet) of the cooling unit 102—configured to measure an outlet temperature of the product fluid. Further, the cooling system 100 can include a controller configured to read measurements output by the set of sensors. In this example, the controller can: access a first inlet temperature of the product fluid; access a first inlet humidity of the product fluid; access a first outlet temperature of the product fluid; calculate a target outlet temperature of the product fluid based on the first inlet temperature and the first inlet humidity; and characterize a difference between the first outlet temperature and the target outlet temperature. The controller can then automatically adjust an inlet flowrate of the cooling fluid (e.g., water) based on this difference in order to drive the measured outlet temperature of the product fluid toward the target outlet temperature.

As a person skilled in the art will recognize from the previous detailed description and from the figures and claims, modifications and changes can be made to the embodiments of the invention without departing from the scope of this invention as defined in the following claims.

I claim:

1. A cooling system comprising:
   a first cooling unit comprising;
      a substrate:
         comprising a thermally conductive material and a network of pores extending between a first set of surfaces of the substrate; and
         defining:
            a base; and
            a heatsink structure extending from the base, coated with a coating, and configured to:
               release thermal energy via evaporation of moisture, contained in pores of the coating, into a stream of air flowing over the heatsink structure to cool the heatsink structure and the stream of air and induce:
                  a first temperature gradient between the heatsink structure and the stream of air flowing over the heatsink structure; and
                  a second temperature gradient between a product fluid flowing through a set of fluid channels, extending through the substrate and the heatsink structure;
               communicate thermal energy from the stream of air, flowing over the heatsink structure, into the heatsink structure to cool the stream of air at a first rate proportional the first temperature gradient; and
               communicate thermal energy from the product fluid, flowing through the set of fluid channels, into the heatsink structure to cool the product fluid at a second rate proportional the second temperature gradient; and
      the coating:
         comprising a porous, hydrophilic material;
         extending across a second set of surfaces of the heatsink structure and lining the network of pores of the substrate; and
         configured to cooperate with the substrate to wick moisture through the network of pores and into pores of the coating;
   a water supply fluidly coupled to the first cooling unit and configured to supply water to the heatsink structure;
   a condenser fluidly coupled to the first cooling unit, comprising a set of coils, and configured to:
      receive the stream of air from the first cooling unit; and communicate thermal energy from a product fluid, flowing through the set of coils, into the stream of air flowing over the set of coils;
a working fluid duct configured to communicate the stream of air across the heatsink structure and toward the set of coils;
a fan fluidly coupled to the working fluid duct and configured to regulate flow of the stream of air in a first direction across the heatsink structure and the set of coils; and
the set of fluid channels:
fluidly coupled to an outlet of the set of coils and extending through the substrate; and
configured to communicate the product fluid from the outlet of the set of coils and through the substrate to cool the product fluid flowing through the set of fluid channels via evaporation of moisture from the heatsink structure.

2. The cooling system of claim 1, further comprising a set of supply channels:
extending between a third set of surfaces of the substrate;
configured to communicate water, from the water supply, through the substrate to release moisture into the heatsink structure via perforations in the set of supply channels; and
wherein the heatsink structure is configured to cool water flowing through the set of supply channels via evaporation of moisture from pores of the coating into the stream of air flowing over the heatsink structure.

3. The cooling system of claim 1:
wherein the heatsink structure is configured to release thermal energy via evaporation of moisture comprising water; and
wherein the condenser is configured to communicate thermal energy from the product fluid, comprising a refrigerant, into the stream of air.

4. The cooling system of claim 1, wherein the heatsink structure defines:
a first end configured to receive the stream of air at:
temperatures within a first temperature range; and
humidities within a first humidity range; and
a second end, opposite the first end, configured to output the stream of air at:
temperatures within a second temperature range less than temperatures within the first temperature range; and
humidities within a second humidity range exceeding humidities within the first humidity range.

5. The cooling system of claim 1:
wherein the heatsink structure comprises:
a first region extending from a first side of the base and along a first portion of the base; and
a second region extending from the first side of the base and along a second portion of the base;
wherein the coating extends across the second set of surfaces of the first region and the second region;
wherein the fan is configured to draw the stream of air across the heatsink structure in the first direction from the first region toward the second region of the heatsink structure; and
wherein the heatsink structure, the coating, and the fan cooperate to induce a moisture gradient comprising a distribution of moisture, contained in pores of the coating, across the heatsink and defining:
a first concentration of moisture in the first region of the heatsink structure; and
a second concentration of moisture in the second region of the heatsink structure, the second concentration less than the first concentration.

6. The cooling system of claim 5:
wherein the first region of the heatsink structure is configured to:
communicate thermal energy from the stream of air, flowing over the first region of the heatsink structure, into the heatsink structure at a first indirect cooling rate; and
release thermal energy via evaporation of moisture into the stream of air, flowing over the first region of the heatsink structure, at a first direct cooling rate; and
wherein the second region of the heatsink structure is configured to:
communicate thermal energy from the stream of air, flowing over the second region of the heatsink structure, into the heatsink structure at a second indirect cooling rate, less than the first indirect cooling rate; and
release thermal energy via evaporation of moisture into the stream of air, flowing over the second region of the heatsink structure, at a second direct cooling rate greater than the first direct cooling rate.

7. The cooling system of claim 1:
wherein the heatsink structure comprises:
a first heatsink structure extending from a first side of the base and along a first portion of the base; and
a second heatsink structure extending from the first side of the base and along a second portion of the base;
wherein the fan is configured to draw the stream of air across the heatsink structure in the first direction, from the first heatsink structure toward the second heatsink structure;
wherein the coating extends across the second set of surfaces of the second heatsink structure;
wherein the first heatsink structure is configured to communicate thermal energy from the stream of air, flowing over the first heatsink structure, into the second heatsink structure to cool the stream of air; and
wherein the second heatsink structure is configured to release thermal energy via evaporation of moisture, contained in pores of the coating, into the stream of air, flowing over the second heatsink structure, to cool the heatsink structure and the stream of air.

8. The method of claim 1:
wherein the substrate comprises the thermally conductive material comprising a graphite foam; and
wherein the coating comprises a first volume of water mixed with a second volume of cement.

9. The method of claim 1:
wherein the working fluid duct is configured to:
communicate the stream of air in the first direction from a first end of the heatsink structure toward a second end of the heatsink structure; and
communicate the stream of air from the second end of the heatsink structure across the set of coils of the condenser;
wherein the heatsink structure is configured to cool the stream of air, flowing over the heatsink structure in the first direction from the first end toward the second end, from a first temperature at the first end to a second temperature at the second end, the second temperature less than the first temperature; and
wherein the condenser is configured to communicate thermal energy from the product fluid, flowing through the set of coils, into the stream of air flowing over the set of coils to cool the product fluid from a third temperature at a fluid inlet of the set of coils to a fourth temperature at the fluid outlet of the set of coils, the fourth temperature less than the third temperature.

10. A cooling system comprising:
a cooling unit comprising;
  a substrate:
    comprising a thermally conductive material and an open network of pores extending between a first set of surfaces of the substrate; and
    defining a base and a heatsink structure extending from the base;
  a coating:
    comprising a porous, hydrophilic material; and
    extending across a second set of surfaces of the substrate and lining the open network of pores; and
  a set of fluid channels:
    extending through the substrate; and
    configured to communicate a product fluid through the substrate;
a working fluid duct configured to communicate air across the heatsink structure;
a blower configured to promote airflow in a first direction through the working fluid duct and across the heatsink structure; and
wherein the heatsink structure is configured to:
  communicate thermal energy from air, flowing over the heatsink structure, into the heatsink structure;
  release thermal energy via evaporation of moisture, contained in pores of the coating, into air flowing over the heatsink structure within the working fluid duct; and
  communicate thermal energy from the product fluid, flowing through the set of fluid channels, into the heatsink structure to cool the product fluid.

11. The cooling system of claim 10:
wherein the fan is configured to draw air in the first direction, from a first end of the heatsink structure toward a second end of the heatsink structure, across the heatsink structure;
wherein the set of fluid channels:
  defines an inlet section and an outlet section opposite the inlet section within the heatsink structure; and
  is configured to transport the product fluid in a second direction through the substrate from the inlet section toward the outlet section; and
wherein the heatsink structure is configured to:
  receive air, flowing through the working fluid duct, at the first end of the heatsink structure, exhibiting:
    temperatures within a first temperature range; and
    humidities within a first humidity range;
  output air, at the second end, exhibiting:
    temperatures within a second temperature range less than temperatures within the first temperature range; and
    humidities within a second humidity range exceeding humidities within the first humidity range;
  receive the product fluid, at the inlet section, in a vapor phase and exhibiting temperatures within a third temperature range; and
  output the product fluid, at the outlet section, in a liquid phase and exhibiting temperatures within a fourth temperature range less than temperatures within the third temperature range.

12. The method of claim 10:
further comprising, a water supply fluidly coupled to the cooling unit and configured to supply water to the heatsink structure; and
wherein the coating and the substrate cooperate to wick water, received from the water supply, through the open network of pores and into pores of the coating.

13. The method of claim 10:
further comprising a condenser comprising a set of coils and configured to:
  receive air from the cooling unit; and
  communicate thermal energy from the product fluid, flowing through the set of coils, into air flowing over the set of coils;
wherein the working fluid duct is configured to communicate air across the first heatsink structure and toward the set of coils; and
wherein the set of fluid channels is fluidly coupled to a fluid outlet of the set of coils and configured to receive the product fluid from the outlet of the set of coils.

14. The method of claim 13:
wherein the working fluid duct is configured to:
  communicate air in the first direction from a first end of the heatsink structure toward a second end of the heatsink structure; and
  communicate air from the second end of the heatsink structure across the set of coils of the condenser;
wherein the condenser is configured to communicate thermal energy from the product fluid, flowing through the set of coils, into air flowing over the set of coils to cool the product fluid from a first temperature at a fluid inlet of the set of coils to a second temperature at the fluid outlet of the set of coils, the second temperature less than the third temperature;
wherein the set of fluid channels defines a channel inlet fluidly coupled to the fluid outlet of the set of coils and a channel outlet; and
wherein the heatsink structure is configured to:
  cool air, flowing over the heatsink structure in the first direction from the first end toward the second end, from a third temperature at the first end to a fourth temperature at the second end, the fourth temperature less than the third temperature; and
  cool the product fluid, flowing through the set of fluid channels, from the second temperature at the channel inlet to a fifth temperature at the channel outlet, the fifth temperature less than the second temperature.

* * * * *